United States Patent [19]
Narayan et al.

[11] Patent Number: 5,852,727
[45] Date of Patent: Dec. 22, 1998

[54] INSTRUCTION SCANNING UNIT FOR LOCATING INSTRUCTIONS VIA PARALLEL SCANNING OF START AND END BYTE INFORMATION

[75] Inventors: Rammohan Narayan; Thang M. Tran, both of Austin, Tex.

[73] Assignee: Advanced Micro Devices, Inc., Sunnyvale, Calif.

[21] Appl. No.: 813,568

[22] Filed: Mar. 10, 1997

[51] Int. Cl.[6] .................................................... G06F 9/38
[52] U.S. Cl. ...................... 395/391; 395/391; 395/386; 395/389
[58] Field of Search ................................ 395/380, 386, 395/388, 389, 390, 391

[56] References Cited

U.S. PATENT DOCUMENTS

| | | | |
|---|---|---|---|
| 4,037,213 | 7/1977 | Atkins et al. | 395/388 |
| 4,044,338 | 8/1977 | Wolf | 365/49 |
| 4,453,212 | 6/1984 | Gaither et al. | 711/2 |
| 4,714,994 | 12/1987 | Oklobdziju et al. | 395/383 |
| 4,807,115 | 2/1989 | Torng | 395/391 |
| 4,858,105 | 8/1989 | Kuriyama et al. | 395/582 |
| 4,928,223 | 5/1990 | Dao et al. | 395/597 |
| 4,992,934 | 2/1991 | Portanova et al. | 395/385 |
| 5,053,631 | 10/1991 | Perlman et al. | 364/748.14 |
| 5,058,048 | 10/1991 | Gupta et al. | 364/748.14 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 0 651 322 A1 | 5/1995 | European Pat. Off. . |
| 0 685 788 A1 | 12/1995 | European Pat. Off. . |
| 2 263 987 A | 8/1993 | United Kingdom . |
| 2263985 | 8/1993 | United Kingdom . |
| 2263987 | 8/1993 | United Kingdom . |
| 2281422 | 3/1995 | United Kingdom . |
| 96/10783 | 4/1996 | WIPO . |

OTHER PUBLICATIONS

An Efficient Algorithm for Exploiting Multiple Arithmetic Units by Tamasulo, 1967, IBM Journal, pp. 25–33.
Pre–Decoding Mechanism for Superscalar Architecture by Minagawa, e al., 1991, IEEE Publication, pp. 21–24.
Intel, "Chapter 2: Microprocessor Architecture Overview." pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6" Byte, Jan. 1996, 4 pages.

*Primary Examiner*—Parshotam S. Lall
*Assistant Examiner*—Viet Vu
*Attorney, Agent, or Firm*—Conley, Rose & Tayon, PC; B. Noel Kivlin; Lawrence J. Merkel

[57] ABSTRACT

An instruction scanning unit for a superscalar microprocessor is disclosed. The instruction scanning unit processes start, end, and functional byte information (or predecode data) associated with a plurality of contiguous instruction bytes. The processing of start byte information and end byte information is performed independently and in parallel, and the instruction scanning unit produces a plurality of scan values which identify valid instructions within the plurality of contiguous instruction bytes. Additionally, the instruction scanning unit is scaleable. Multiple instruction scanning units may be operated in parallel to process a larger plurality of contiguous instruction bytes. Furthermore, the instruction scanning unit detects error conditions in the predecode data in parallel with scanning to locate instructions. Moreover, in parallel with the error checking and scanning to locate instructions, MROM instructions are located for dispatch to an MROM unit.

20 Claims, 11 Drawing Sheets

U.S. PATENT DOCUMENTS

| | | | |
|---|---|---|---|
| 5,129,067 | 7/1992 | Johnson | 395/389 |
| 5,136,697 | 8/1992 | Johnson | 395/586 |
| 5,185,868 | 2/1993 | Tran | 395/393 |
| 5,226,126 | 7/1993 | McFarland et al. | 395/394 |
| 5,226,130 | 7/1993 | Favor et al. | 395/585 |
| 5,233,694 | 8/1993 | Hotta et al. | 395/391 |
| 5,233,696 | 8/1993 | Suzuki | 395/380 |
| 5,337,415 | 8/1994 | DeLano et al. | 395/389 |
| 5,438,668 | 8/1995 | Coon et al. | 395/380 |
| 5,459,844 | 10/1995 | Eickemeyer et al. | 395/389 |
| 5,471,628 | 11/1995 | Phillips et al. | 395/564 |
| 5,499,204 | 3/1996 | Barrera et al. | 365/49 |
| 5,559,975 | 9/1996 | Christie et al. | 395/571 |
| 5,560,028 | 9/1996 | Sachs et al. | 395/800.23 |
| 5,566,298 | 10/1996 | Boggs et al. | 395/182.08 |
| 5,581,718 | 12/1996 | Grochowski | 395/382 |
| 5,586,276 | 12/1996 | Grochowski et al. | 395/380 |
| 5,586,277 | 12/1996 | Brown et al. | 395/386 |
| 5,600,806 | 2/1997 | Brown et al. | 395/380 |
| 5,625,787 | 4/1997 | Malvin et al. | 395/380 |
| 5,644,744 | 7/1997 | Mahin et al. | 395/383 |

INSTRUCTION SCANNING UNIT FOR LOCATING INSTRUCTIONS VIA PARALLEL SCANNING OF START AND END BYTE INFORMATION

BACKGROUND OF THE INVENTION

1. Field of the Invention

This invention relates to the field of superscalar microprocessors and, more particularly, to instruction dispatch mechanisms within superscalar microprocessors.

2. Description of the Relevant Art

Superscalar microprocessors are capable of attaining performance characteristics which surpass those of conventional scalar processors by allowing the concurrent execution of multiple instructions. Due to the widespread acceptance of the x86 family of microprocessors, efforts have been undertaken by microprocessor manufacturers to develop superscalar microprocessors which execute x86 instructions. Such superscalar microprocessors achieve relatively high performance characteristics while advantageously maintaining backwards compatibility with the vast amount of existing software developed for previous microprocessor generations such as the 8086, 80286, 80386, and 80486.

The x86 instruction set is relatively complex and is characterized by a plurality of variable byte length instructions. An x86 instruction includes from one to five optional prefix bytes followed by an operation code (opcode) field, an optional addressing mode (Mod R/M) byte, an optional scale-index-base (SIB) byte, an optional displacement field, and an optional immediate data field.

The opcode field defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat a string operation a number of times. The opcode field may be one or two bytes in length. The addressing mode (Mod R/M) byte specifies the registers used as well as memory addressing modes used by the instruction. The SIB byte is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field, which may be from one to four bytes in length. The displacement field contains a constant used in address calculations. The optional immediate field, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

The complexity of the x86 instruction set poses difficulties in implementing high performance x86 compatible superscalar microprocessors. One difficulty arises from the fact that instructions must be aligned with respect to the parallel-coupled instruction decoders of such processors before proper decode can be effectuated. In contrast to most RISC instruction formats, the x86 instruction set consists of variable byte length instructions. The variable byte length nature implies that the start bytes of successive instructions within a line are not necessarily equally spaced, and the number of instructions per line is not fixed. As a result, employment of simple, fixed-length shifting logic cannot in itself solve the problem of instruction alignment. Although scanning logic has been proposed to dynamically find the boundaries of instructions during the decode pipeline stage (or stages) of the processor, such a solution typically requires that the decode pipeline stage of the processor be implemented with a relatively large number of cascaded levels of logic gates and/or the allocation of several clock cycles to perform the scanning operation.

Another problem related to the detection of variable byte length instructions is incurred by microprocessors which define certain complex instructions as microcode instructions. "Microcode instructions", as used herein, are instructions which are not directly decoded by the parallel-coupled instruction decoders of the superscalar microprocessor. Instead, microcode instructions are routed to a microcode unit which decomposes the microcode instructions into simpler operations which may be decoded by the parallel-coupled instruction decoders. The microcode instructions, therefore, must be detected prior to decode of the instructions and routed to the microcode unit.

Certain microprocessors may employ predecoding as a method for locating variable byte length instructions. However, particularly if a cache line may be partially predecoded, the predecode data may be invalid for a given cache line fetched for dispatch within the microprocessor. A method for validating the predecode data is therefore needed.

SUMMARY OF THE INVENTION

The problems outlined above are in large part solved by a microprocessor employing an instruction scanning unit in accordance with the present invention. The microprocessor employs predecoding, in which predecode information is generated for a set of instruction bytes prior to storing the instruction bytes into an instruction cache. In particular, the start and end of instructions are indicated. Additionally, a set of functional bits are defined which indicate the opcode byte of the instruction as well as the microcode/non-microcode nature of each instruction, among other things. When the instruction are fetched, the corresponding predecode data is fetched as well. The instruction scanning unit receives the predecode data, and scans the predecode data to locate the beginning and end of each instruction. The predecode data is independently scanned within multiple regions of the set of bytes, thereby increasing the number of instructions which may be located in a given clock cycle.

The instruction scanning unit speculatively generates instruction valid masks based upon the predecode data defining the start of instructions. A mask is generated for each byte within a particular region, assuming that that byte is an end byte of an instruction. In parallel, the predecode data defining the ends of instructions is scanned. The number of instructions ending prior to each byte in the region is counted. Subsequently, certain ones of the instruction valid masks are selected via the instruction end counts and the predecode data defining the end of instructions. If a byte is the end of an instruction and there are no instructions ending prior to that byte within the region, then the instruction valid mask corresponding to that byte is selected as the first instruction from the region. Similarly, if a second byte is the end of an instruction and there is one instruction ending prior to that second byte within the region, then the instruction valid mask corresponding to that second byte is selected as the second instruction from the region, etc. By processing the start and end predecode data separately, a faster scanning of the predecode data may be realized. The instructions identified by the instruction scanning unit are selected for dispatch into the instruction processing pipeline of the microprocessor.

In parallel with scanning the predecode data to identify instructions for dispatch into the instruction processing pipeline, the instruction scanning unit scans the predecode data to locate microcode instructions within the set of instruction bytes. Microcode instructions so identified are dispatched to a microcode unit as well as into the instruction processing pipeline of the microprocessor. By identifying the microcode instructions during instruction scanning, the microcode unit may begin processing the microcode instructions earlier in the instruction processing pipeline. The execution time of the microcode instructions may thereby be improved over microprocessors which identify microcode instructions at a later point in the instruction processing pipeline.

The microprocessor relies on the validity of the predecode data in order to properly route instructions being fetched. However, predecode data may be invalid for a variety of causes. Predecoding of a block of instructions may be interrupted, or the dynamic behavior of the program may cause instructions to be executed in a different manner than previously experienced. The instruction scanning unit, in parallel with scanning the predecode data for dispatching instructions and for microcode instructions, scans the predecode data for validity. The set of error conditions scanned for is sufficient to verify that the predecode data is correct. When incorrect predecode data is detected, the instruction scanning unit routes an invalid pointer and an indication of the invalidity to the predecode unit. The predecode unit subsequent predecodes the instruction bytes, thereby providing valid predecode data.

Broadly speaking, the present invention contemplates an instruction scanning unit comprising at least one scan block and a microcode scan unit. The scan block is configured to scan predecode information corresponding to a set of instruction bytes in order to locate instructions for dispatch to an instruction alignment unit. The microcode scan unit is configured to scan the predecode information in parallel with the scan block. The microcode scan unit is configured to detect microcode instructions for dispatch to a microcode unit.

The present invention further contemplates a method for locating microcode instructions within a plurality of instruction bytes and dispatching the microcode instructions to a microcode unit. A plurality of end bits and a plurality of functional bits are examined to identify microcode instructions. Each of the plurality of end bits and a corresponding one of the plurality of functional bits corresponds to one of the plurality of instruction bytes. A first microcode instruction identified by a first one of the plurality of end bits and a first corresponding one of the plurality of functional bits is dispatched.

The present invention still further contemplates an instruction scanning unit comprising at least one scan block and an invalid instruction scan unit. The scan block is configured to scan predecode information corresponding to a set of instruction bytes in order to locate instructions for dispatch to an instruction alignment unit. The invalid instruction scan unit is configured to scan the predecode information in parallel with the scan block, The invalid instruction scan unit is configured to detect invalid predecode information and to identify, via an invalid instruction pointer, a byte within the set of instruction bytes at which predecoding is to be performed to generate valid predecode information.

The present invention yet further contemplates a method for detecting invalid predecode data. The predecode data is scanned for validity in parallel with locating instructions via the predecode data. An invalid instruction pointer is determined as well. The invalid instruction pointer indicates a byte at which the predecode data becomes invalid.

Furthermore, the present invention contemplates an instruction scanning unit for scanning a block of predecode information associated with a plurality of contiguous instruction bytes. The block of predecode information includes start byte information indicative of bytes which start instructions and end byte information indicative of bytes which end instructions. The instruction scanning unit comprises a first subunit and a second subunit. The first subunit is coupled to receive the start byte information, and is configured to generate a plurality of instruction valid values. Each of the plurality of instruction valid values is indicative of a potential valid instruction starting at a first byte within the plurality of contiguous instruction bytes and ending at a second byte within the plurality of contiguous instruction bytes. The first byte is indicated to be a start byte by the start byte information, and the second byte is different for each one of the plurality of instruction valid values. Coupled to receive the end byte information, the second subunit is configured to generate a plurality of instruction end counts. Each of the instruction end counts is indicative of a number of instructions which end between a first one of the plurality of contiguous instruction bytes and a particular one of the plurality of contiguous instruction bytes. The first subunit and the second subunit operate in parallel.

Moreover, the present invention contemplates a method for concurrently locating variable byte length instructions. Start byte information corresponding to a plurality of contiguous bytes is scanned to create a plurality of instruction valid values. Each of the plurality of instruction valid values is indicative of a potential valid instruction beginning at a first of the plurality of contiguous bytes and ending at a second of the plurality of contiguous bytes. The first of the plurality of contiguous bytes is identified by the start byte information to be a start byte. One of the plurality of instruction valid values is selected. The second one of the plurality of contiguous bytes corresponding to the selected one of the plurality of instruction valid values is identified by end byte information corresponding to the plurality of instruction valid values to be an end byte.

BRIEF DESCRIPTION OF THE DRAWINGS

Other objects and advantages of the invention will become apparent upon reading the following detailed description and upon reference to the accompanying drawings in which.

Figure 1:
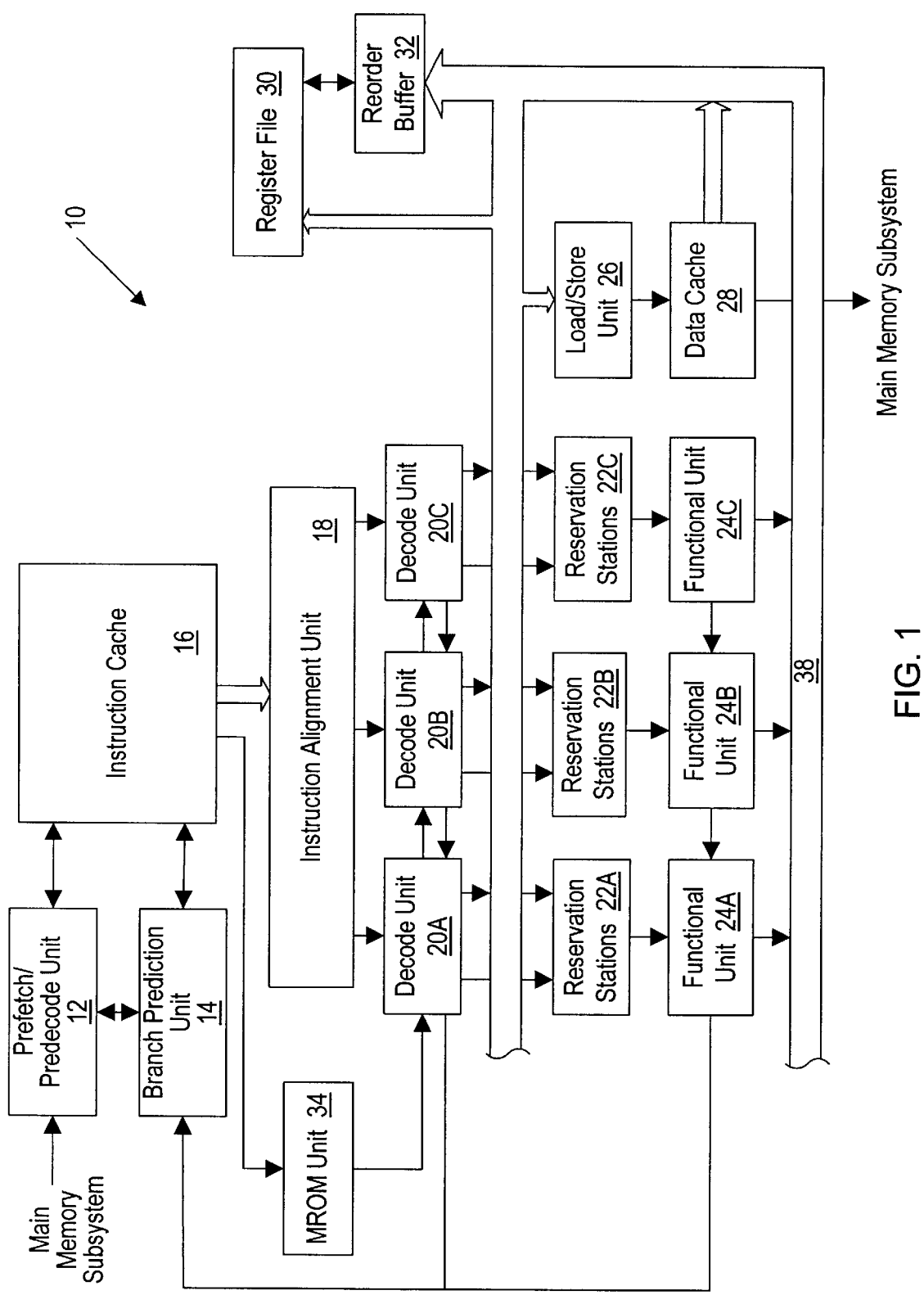
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, instruction cache 16 includes an instruction scanning unit configured to scan predecode data fetched from the instruction cache. The instruction scanning unit independently and in parallel locates instructions from multiple regions of a set of bytes being scanned, thereby increasing the maximum number of instructions which may be concurrently located and conveyed to instruction alignment unit 18. The predecode data includes both start and end bits, and the start and end bits are further scanned in parallel with each other to locate the instructions, further decreasing the number of cascaded levels of logic used to locate the instructions.

Because the predecode data must be correct for microprocessor 10 to operate properly, the instruction scanning unit scans the predecode data for validity as well. If invalid predecode data is detected, the instructions are routed to prefetch/predecode unit 12 for predecoding. The validity checking identifies the byte at which predecoding should begin, advantageously reducing the amount of predecoding performed when partially valid predecode data is detected. Additionally, MROM instructions are dispatched to MROM unit 34 as well as to instruction alignment unit 18. Therefore, the predecode data is scanned independently for MROM instructions in addition to the scanning performed for dispatch to instruction alignment unit 18. The MROM instruction scanning is performed in parallel with instruction scanning for dispatch to instruction alignment unit 18.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. MROM instructions are an example of microcode instructions. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A.

Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
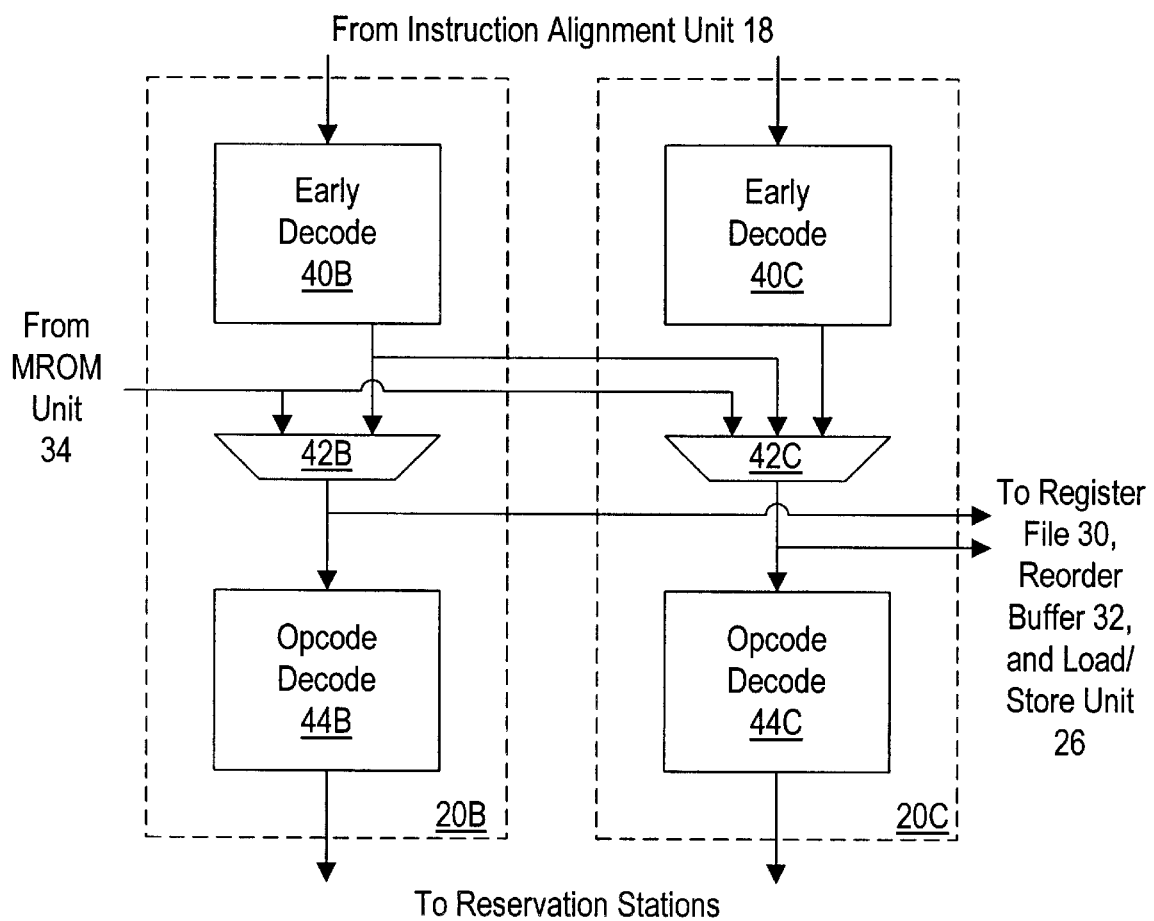
FIG. 2 is a block diagram of one embodiment of a pair of decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexer 42C selects between instructions provided by MROM unit 34, early decode unit 40B, and early decode unit 40C. The instruction from MROM unit 34 is selected during times in which MROM unit 34 is dispatching instructions. During times in which early decode unit 40A detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
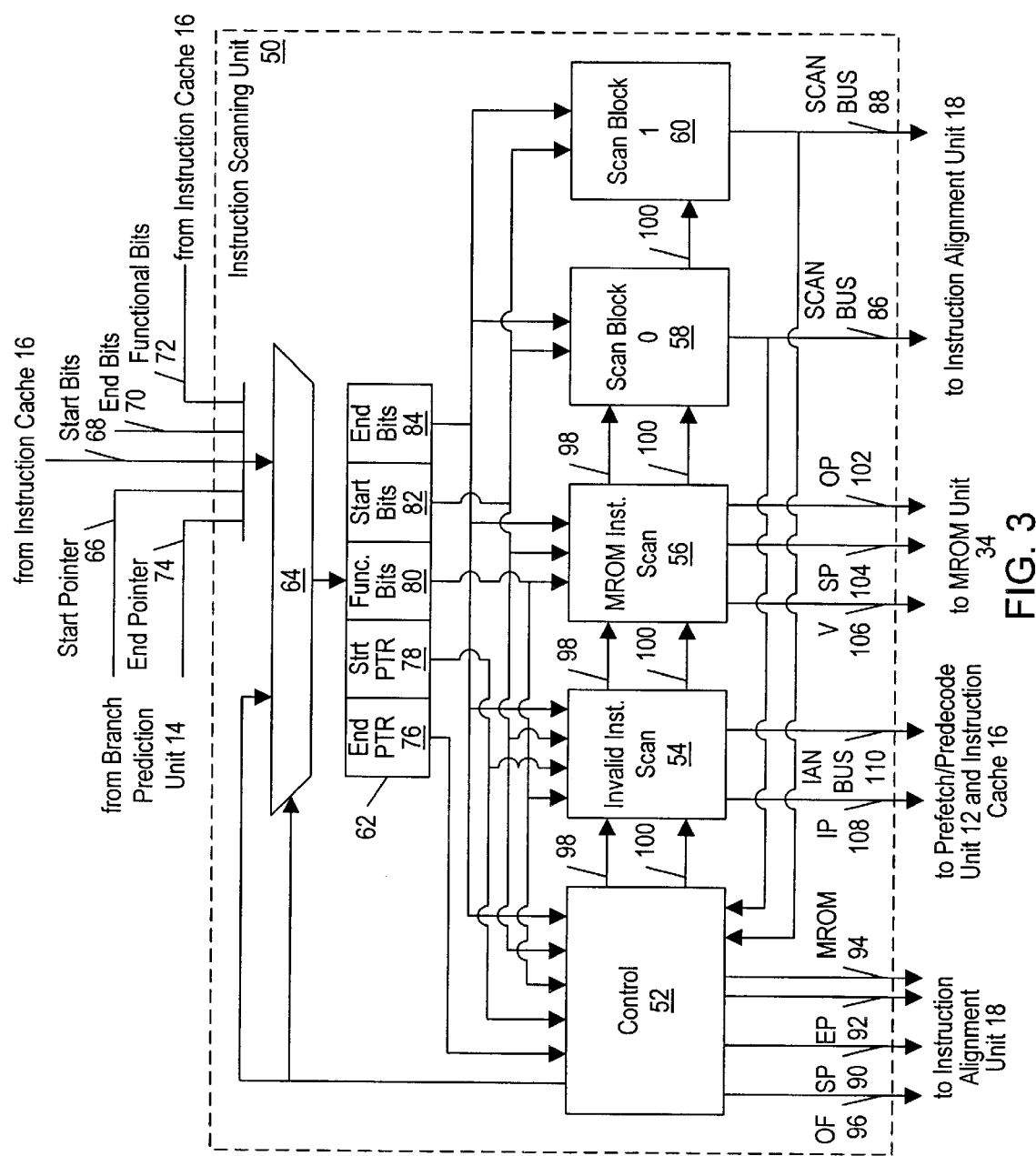
FIG. 3 is a block diagram of one embodiment of an instruction scanning unit included within an instruction cache shown in FIG. 1.

Turning now to FIG. 3, a block diagram of one embodiment of an instruction scanning unit 50 is shown. In microprocessor 10, instruction scanning unit 50 is included within instruction cache 16. As shown in FIG. 3, instruction scanning unit 50 includes a control unit 52, an invalid instruction scan unit 54, an MROM instruction scan unit 56, a first scan block 58, and a second scan block 60. A register 62 is included for storing data corresponding to a set of instruction bytes being scanned. Register 62 receives as an input the output of a multiplexor 64. Multiplexor 64 provides, under the control of control unit 52, either data corresponding to a new set of instruction bytes fetched from instruction cache 16 or updated data indicating dispatch of zero or more instructions from the set of instruction bytes represented by the data stored in register 62. In one embodiment, a set of instruction bytes is 16 bytes corresponding to either an upper half or a lower half of a 32 byte instruction cache line. The set of 16 instruction bytes is divided into two regions of eight bytes each, which are scanned independent from each other. In other embodiments, a set may include more or fewer bytes and more or fewer regions.

Instruction scanning unit 50 identifies valid instructions within the set of instruction bytes being scanned, so that instruction alignment unit 18 may align the instructions to decode units 20. More particularly, instruction scanning unit 50 provides a set of valid masks for instructions within the set of instruction bytes. Each valid mask includes binary ones corresponding to byte positions occupied by the bytes of a particular instruction. Additionally, start pointers and end pointers encoding offsets within the set of instruction bytes at which each instruction begins and ends are generated by instruction scanning unit 50. An indication of the fast path/MROM nature of each instruction is provided as well. Still further, an indication of an instruction which overflows from the set of instruction bytes or between regions within the set of instruction bytes is provided.

Instruction scanning unit 50 receives information regarding the set of bytes being fetched from instruction cache 16 and branch prediction unit 14. In particular, instruction scanning unit receives a set of start bits on a start bits bus 68, a set of end bits upon an end bits bus 70, and a set of functional bits upon a functional bits bus 72, all from instruction cache 16. Additionally, an end pointer is received from branch prediction unit 14 upon an end pointer bus 74 and a start pointer is received upon a start pointer bus 66 from branch prediction unit 14 as well. The start pointer and the end pointer are offsets within the set of instruction bytes represented by the start, end, and functional bits provided upon buses 68–72. The start pointer indicates the byte identified by the fetch address presented to instruction cache 16. Bytes prior to the start pointer are not requested by the instruction fetching mechanism of microprocessor 10. For example, a branch instruction may have a target address which indicates a byte other than the first byte in the set of instruction bytes. In other cases, the first byte in the set of instruction bytes may be being fetched (e.g. when the previous set of instruction bytes did not include a predicted taken branch instruction). In these cases, the start pointer is zero (e.g. an offset of zero). Branch prediction unit 14 generates the end pointer based upon the existence (or lack thereof) of a branch instruction within the set of instruction bytes. The end pointer indicates the end byte of the last instruction within the set of instruction bytes to be executed in accordance with the branch prediction stored for the set of instruction bytes.

The start pointer and the end pointer, taken together, define a subset of the set of instruction bytes which are to be dispatched as instructions to instruction alignment unit 18. Instructions between the start pointer and the end pointer are dispatched, while instructions prior to the start pointer or subsequent to the end pointer are not selected as part of the instructions being dispatched during the current clock cycle. The start, end, and functional bits correspond to the set of instruction bytes being fetched, as described above.

If instruction scanning unit 50 is not in the process of scanning a previous set of instruction bytes when instruction cache 16 provides a set of instruction bytes, control unit 52 causes multiplexor 64 to select the start pointer, end pointer, start bits, end bits, and functional bits provided by instruction cache 16 and branch prediction unit 14 into register 62. On the other hand, if a previous set of instruction bytes has not been completely scanned and transmitted to instruction alignment unit 18, an updated set of start bits, end bits, and functional bits indicating the instructions remaining to be scanned and transmitted are provided to multiplexor 64, which selects the updated values into register 62.

Register 62 stores a current end pointer 76, a current start pointer 78, a current set of functional bits 80, a current set of start bits 82, and a current set of end bits 84. The current values stored in register 62 initially comprise the values provided by instruction cache 16 and branch prediction unit 14, and are subsequently updated by control unit 52 if more than one clock cycle is needed to scan and convey all of the instructions from the set of instruction bytes to instruction alignment unit 18.

First scan block 58 and second scan block 60 independently scan regions of the set of instruction bytes. In the present embodiment, up to three instructions are located within each region and conveyed to instruction alignment unit 18. First scan block 58 and second scan block 60 form the valid masks for each of the located instructions for their respective regions based upon the start bits 82 and end bits 84 provided from register 62. The valid masks are conveyed upon scan buses 86 and 88.

Each scan block receives the start bits and end bits corresponding to the region that scan block scans. For example, according to one embodiment, first scan block 58 scans the first eight bytes of the set of instruction bytes while second scan block 60 scans the second eight bytes of the set of instruction bytes. Therefore, first scan block 58 receives the portion of start bits 82 and end bits 84 corresponding to the first eight bytes while second scan block 60 receives the portion of start bits 82 and end bits 84 corresponding to the second eight bytes. By scanning the start and end bits, scan blocks 58 and 60 can locate the valid instructions within the line. Additionally, scan blocks 58 and 60 receive masks generated by control unit 52 based upon the start and end pointers. The masks indicate which of the bytes are valid for dispatch, and are used by the scan blocks to select the appropriate valid bytes (i.e. those which are first, in program order, among the instructions between the start and the end pointer). The masks are conveyed upon a set of mask buses 98 and 100. Bus 98 provides the mask for the first region of the set of instruction bytes, and bus 100 provides the mask for the second region of the set of instruction bytes.

In addition to being provided to instruction alignment unit 18, scan buses 86 and 88 are provided to control unit 52 for determining which instructions have been successfully identified to instruction alignment unit 18. Control unit 52 masks the start and end bits corresponding to instructions which have been successfully conveyed to instruction alignment unit 18. Instructions are successfully conveyed by first scan block 58 as long as instruction alignment unit 18 is capable of accepting the instructions (i.e. not stalling due to any buffer full conditions, etc.). Instructions are successfully conveyed by second scan block 60 if first scan block 58 is concurrently or has previously conveyed all of the instructions from the first region of the set of bytes and instruction alignment unit 18 is capable of accepting the instructions. If instructions remain to be dispatched after the masking (or MROM instructions remain to be dispatched to MROM unit 34, as described further below), then control unit 52 provides the updated values to register 62 via multiplexor 64.

Additionally, control unit 52 generates start pointers and end pointers corresponding to each of the valid masks received upon scan buses 86 and 88. Control unit 52 provides these start and end pointers upon a start pointers bus 90 and an end pointers bus 92 to instruction alignment unit 18. Still further, control unit 52 conveys the MROM/fast path nature of each instruction as determined from the functional bits corresponding to the end bits of the selected instruction upon an MROM bus 94. Lastly, control unit 52 provides overflow indications corresponding to each region of instruction bytes. An overflow is indicated if an instruction being conveyed to instruction alignment unit 18 overflows from the first region to the second region, or overflows from the second region to a first region of a subsequently fetched set of instruction bytes, or overflows from the first region through the second region to the first region of the subsequently fetched set of instruction bytes. A signal is included for each overflow indication, and the signal are conveyed upon an overflow bus 96.

MROM instruction scan unit 56 scans the set of instruction bytes for MROM instructions, and provides an opcode pointer, a start pointer, and a set of valid bits to MROM unit 34 for each MROM instruction. Since MROM instructions can be detected by analyzing the functional bits corresponding to end bytes, MROM instruction scan unit 56 receives functional bits 80 and end bits 84 from register 62. Furthermore, start bits 82 are received by MROM instruction scan unit 56 to aid in start pointer formation. In one embodiment, the MROM instructions are provided to MROM unit 34 at a rate of one per clock cycle. Therefore, if multiple MROM instructions reside within a set of instruction bytes, MROM instruction scan unit 56 indicates to control unit 52 that MROM instructions remain to be dispatched to MROM unit 34. As noted above, control unit 52 updates register 62 with values corresponding to the current set of instructions until: (i) all instructions to be dispatched have been conveyed to instruction alignment unit 18 via first scan block 58 and second scan block 60; and (ii) all MROM instructions have been dispatched to MROM unit 34 by MROM instruction scan unit 56. MROM instruction scan unit 56 provides the opcode pointer upon an MROM opcode pointer bus 102, the start pointer upon an MROM start pointer bus 104, and the valid bits upon an MROM valid bus 106.

Invalid instruction scan unit 54 scans start bits 82 and end bits 84 to determine if valid predecode data has been provided with respect to the set of bytes. Invalid instruction scan unit 54 additionally receives start pointer 78 for further checking, as described in more detail below. Instruction alignment unit 18 relies on the predecode data being correct in order to correctly route instructions to decode units 20. However, predecode data for a given set of bytes may be invalid for a variety of reasons. For example, prefetch/predecode unit 12 is configured (according to one embodiment) to discontinue predecoding of a particular set of bytes upon encountering a predicted-taken branch instruction. Therefore, if bytes within the set of bytes which are subsequent to the predicted-taken branch instruction are fetched, then valid predecode data may not have been generated. Similarly, if prefetch/predecode unit 12 is predecoding a prefetched cache line and a request from invalid instruction scan unit 54 to predecode a cache line being fetched is received, prefetch/predecode unit 12 discontinues predecode of the prefetched cache line. Still further, the operation of a program may cause the predecode data to become invalid. For example, a branch instruction may branch to a target address at which the opcode of an instruction is stored, thereby bypassing any prefix bytes for the instruction. In such a case, the start bit for the opcode byte (i.e. the start byte of the instruction for this case) is not set. Many other examples leading to invalid predecode data may occur as well. Invalid instruction scan unit 54 is provided to detect any invalid predecode data.

If invalid instruction scan unit 54 detects invalid predecode data, invalid instruction scan unit 54 provides a pointer to the byte at which the predecode data becomes invalid (upon an invalid pointer bus 108) and an indication of the invalidity detected (upon an invalid bus 110) to prefetch/predecode unit 12. Prefetch/predecode unit 12 subsequently predecodes the set of instruction bytes beginning at the pointer provided by invalid instruction scan unit 54. The newly generated predecode data is stored into instruction cache 16 in the cache line storing the set of instruction bytes, and the newly generated predecode data is provided to instruction scanning unit 50 for scan and dispatch of the appropriate instructions. In one embodiment, invalid instruction scan unit 54 indicates invalidity of the predecode data if it occurs within the first three instructions within the set of instruction bytes (i.e. the instructions being dispatched during the clock cycle by first scan block 58 or second scan block 60). In this manner, the instructions for which valid predecode data has been generated are dispatched prior to submitting the set of instruction bytes to prefetch/predecode unit 12 for predecoding. As with MROM instruction scan unit 56 and scan blocks 58 and 60, invalid instruction scan unit 54 receives the masks upon mask buses 98 and 100 from control unit 52. Invalid instruction scan unit 54 analyzes the predecode data for the instruction bytes between the start and end pointers, as indicated by the masks.

It is noted that, although invalid instruction scan unit 54 and MROM instruction scan unit 56 as shown in FIG. 3 operate upon the set of instruction bytes as a whole, invalid instruction scan unit 54 and MROM instruction scan unit 56 may be divided into regions in a fashion similar to scan blocks 58 and 60. Alternatively, MROM instruction scan unit 56 and invalid instruction scan unit 54 may operate upon regions independently and then select a result for conveyance depending upon the results of each region.

Figure 4:
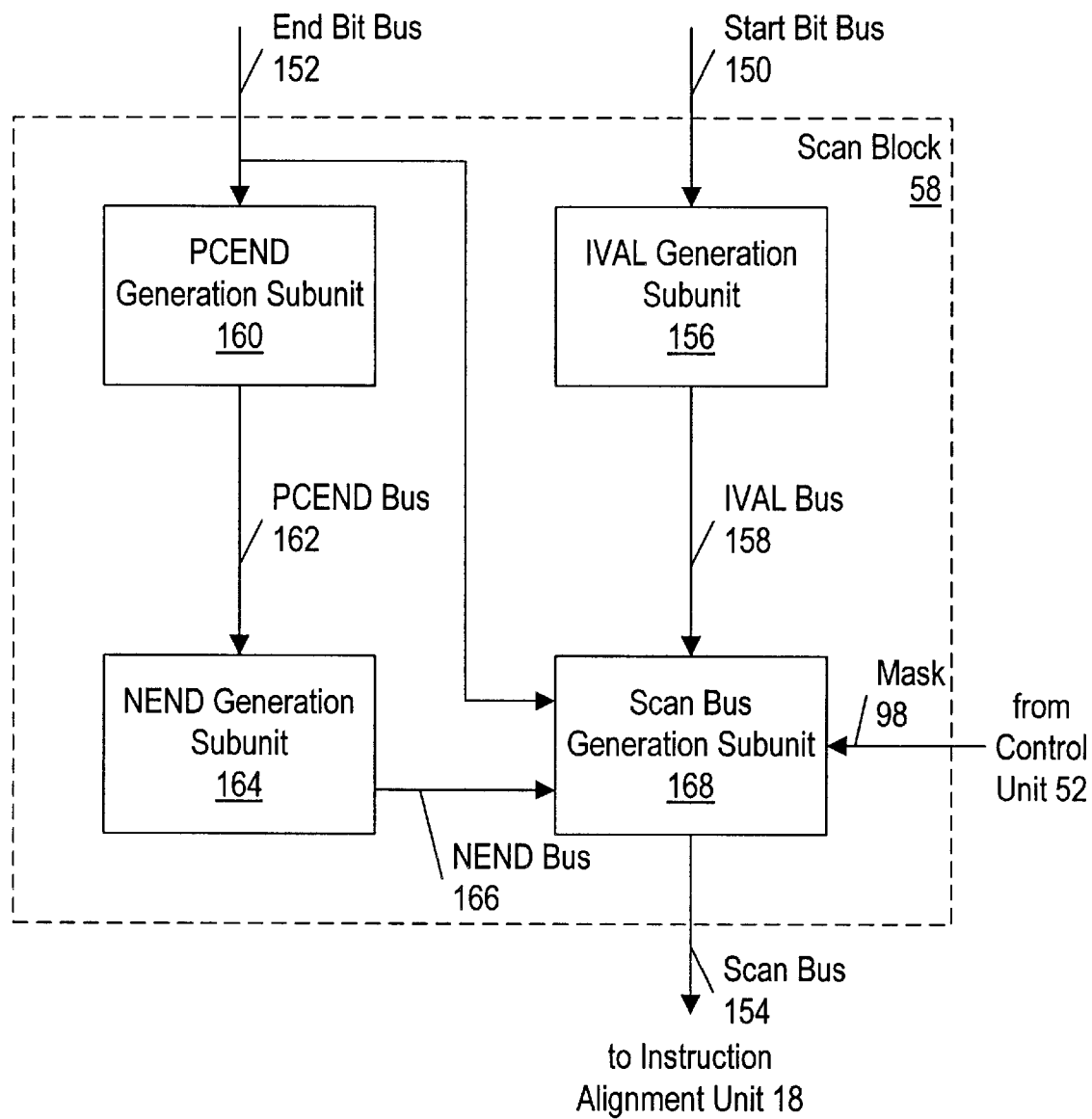
FIG. 4 is a block diagram of one embodiment of a scan block shown in FIG. 3.

Turning now to FIG. 4, an embodiment of first scan block 58 is shown. Second scan block 58 may be configured similarly. First scan block 58 receives a portion of start bits 82 upon a scan start bit bus 150. The portion received corresponds to the region of the set of instruction bytes which first scan block 58 is configured to scan. Additionally, first scan block 58 receives a portion of end bits 84 upon a scan end bit bus 152. First scan block 58 produces a scan bus 154.

First scan block 58 is configured with several subunits which perform various tasks. An IVAL generation subunit 156 is coupled to scan start bit bus 150 and to an IVAL bus 158. A PCEND generation subunit 160 is included, coupled to scan end bit bus 152 and a PCEND bus 162. Also coupled to PCEND bus 162 and to an NEND bus 166 is an NEND generation subunit 164. NEND bus 166 is further coupled to a scan bus generation subunit 168. Further coupled to scan bus generation subunit 168 is scan end bit bus 152, IVAL bus 158, and mask bus 98 from control unit 52.

Generally speaking, first scan block 58 is configured to scan start byte information and end byte information associated with a plurality of contiguous instruction bytes. The start byte information is conveyed on scan start bit bus 150 and the end byte information is conveyed on scan end bit bus 152. Scan start bit bus 150 and scan end bit bus 152 together form an input bus to first scan block 58. First scan block 58 produces a set of scan values on scan bus 154 which are indicative of the boundaries of instructions within the plurality of contiguous instruction bytes. In one embodiment, start and end byte information is conveyed for eight contiguous instruction bytes. First scan block 58 scans the start byte information independently and in parallel with the end byte information in PCEND generation subunit 160, NEND generation subunit 164, and IVAL generation subunit 156. The information so generated is combined in scan bus generation subunit 168, producing a set of masks on scan bus 154. A mask is a field of bits, each bit being associated with one instruction byte within the plurality of contiguous instruction bytes being scanned. If a particular bit of a mask is set, the associated byte is a portion of the instruction identified by that mask. If a particular bit of a mask is clear, the associated byte is not a portion of the instruction identified by that mask. Each mask identifies instruction bytes which form a valid instruction. In one embodiment, scan bus 154 conveys three eight-bit masks identifying the first three valid instructions found within the eight bytes associated with the start and end byte information conveyed to first scan block 58. The masks produced on scan bus 154 are conveyed to instruction alignment unit 18, for use in locating valid instruction bytes from a plurality of instructions associated with the start and end byte information processed by first scan block 58.

As mentioned above, IVAL generation subunit 156 receives start byte information associated with a plurality of contiguous instruction bytes. IVAL generation subunit 156 generates an instruction valid value associated with each byte in the plurality of contiguous instruction bytes. Instruction valid values are values which identify bytes which may form a valid instruction. In one embodiment, the instruction valid values generated by IVAL generation subunit 156 are masks as described above. Each instruction valid value generated by IVAL generation subunit 156 identifies a potentially valid instruction ending at the associated byte within the contiguous instruction bytes being scanned. The potentially valid instruction begins at the byte associated with the first start bit encountered in the associated start byte information prior to the byte position of the associated byte. Furthermore, the start bit corresponding to the associated byte is included in determining the beginning of the potentially valid instruction. Since the end byte information is not available to IVAL generation subunit 156, an instruction valid value is generated for each byte being scanned as if that byte were an end byte. Therefore, the instruction valid values identify potentially valid instructions. The correct instruction valid values may then be selected from this set of instruction valid values according to the end byte information, as will be described below.

PCEND generation subunit 160 and NEND generation subunit 164 are a pair of subunits which generate an instruction end count for each byte being scanned. The instruction end count for a particular byte indicates the number of instructions which end within the eight bytes being scanned but prior to the particular byte. This information, along with the end byte information, may be used to determine which of the instruction valid values generated from IVAL generation subunit 156 are the correct instruction valid values. According to one particular embodiment, the instruction end count indicates if there are zero, one, two or three end bytes prior to a particular byte.

In one embodiment, PCEND generation subunit 160 generates intermediate instruction end counts according to a set of scan regions within the plurality of contiguous instruction bytes being scanned. In one embodiment, four scan regions are used. The first scan region comprises the first byte of the contiguous instruction bytes being scanned. The second scan region includes the second through fourth bytes, while the third scan region includes the fifth through seventh bytes. Finally, the fourth scan region comprises the eighth byte being scanned. For a particular byte within the contiguous bytes being scanned, the associated intermediate instruction end count indicates the number of instructions which end prior to that particular byte but within the scan region that includes the particular byte. Additionally, an instruction which ends in the last byte of the scan region prior to the scan region that includes the particular byte is included in the associated intermediate instruction end count. By generating these intermediate instruction end counts, the logic gates embodying the function may be advantageously limited to a relatively small number of inputs while still utilizing a parallel scanning technique, as will be explained in more detail below. In one embodiment, the intermediate instruction end counts are decoded counts such that a bit set in one position of the count indicates zero prior end bytes; a bit set in another position of the count indicates one prior end byte; etc. These intermediate instruction end counts are conveyed on PCEND bus 162 to NEND generation subunit 164.

NEND generation subunit 164 accepts the intermediate instruction end counts generated by PCEND generation subunit 160 and generates the instruction end counts mentioned above. A particular instruction end count is generated by shifting the instruction end count of the last byte of the previous scan region by the intermediate instruction end count associated with a particular byte of the current scan region. Since the intermediate instruction end count values and the instruction end count values are decoded, the shifting adds the intermediate instruction end count of each byte to the instruction end count of the last byte of the previous scan region. In this manner, the correct instruction end count for each byte may be generated. In one embodiment, the instruction end counts and intermediate instruction end counts convey a value between zero and two. Furthermore, a value may be conveyed indicative of three or more instruction ends. NEND generation subunit 164 conveys the instruction end counts to scan bus generation subunit 168 on NEND bus 166.

Scan bus generation subunit 168 selects a plurality of scan bus values from the instruction valid values conveyed on IVAL bus 158. The plurality of scan bus values are conveyed on scan bus 154. In one embodiment, up to three scan bus values are selected corresponding to the first three valid instructions contained within the plurality of contiguous instruction bytes being scanned. A particular instruction valid value is selected by scan bus generation subunit 168 if the end byte information indicates that the associated byte is an end byte and the instruction end count associated with that byte is between zero and two. The first scan value conveys the instruction valid value associated with an instruction end count of zero. Therefore, the first scan value identifies a valid instruction associated with the first end byte within the plurality of contiguous instruction bytes being scanned (i.e. the first valid instruction within the plurality of contiguous instruction bytes). The second and third scan values similarly identify the second and third valid instructions within the plurality of contiguous instruction bytes being scanned, if that many valid instructions may be located.

At most three instruction valid values will be selected in this manner, according to the present embodiment. First scan block 58 is a parallel instruction scanning unit which (as will be shown below) may be implemented in relatively few cascaded levels of logic. Advantageously, such an instruction scanning unit identifies multiple valid instructions per clock cycle and may allow a short clock cycle design. Similar techniques may be used to identify any number of valid instructions per clock cycle.

The operation of first scan block 58 may be further illuminated through the use of an example. The example will be presented for the embodiment of first scan block 58 that scans eight contiguous instruction bytes and provides up to three scan bus values per clock cycle. Therefore, this embodiment generates eight instruction valid values on IVAL bus 158 (one for each of the eight instruction bytes). These buses will be labeled IVAL0, IVAL1, IVAL2, IVAL3, IVAL4, IVAL5, IVAL6, and IVAL7. Also, the four scan regions described above will be processed by PCEND generation subunit 160. The values of the intermediate instruction end counts will be conveyed on PCEND0, PCEND1, PCEND2, PCEND3, PCEND4, PCEND5, PCEND6, and PCEND7. Each value includes three bits which indicate the number of end bytes prior to the current byte. If bit 0 is set, there are zero end bytes prior to the current byte. If bit 1 is set, there is one end byte prior to the current byte. If bit 2 is set, there are two end bytes prior to the current byte. If no bits are set, there are three or more end bytes prior to the current byte. The instruction end counts generated by NEND generation subunit 164 are conveyed on NEND0, NEND1, NEND2, NEND3, NEND4, NEND5, NEND6, and NEND7. Finally, the scan bus values are conveyed on SCAN0, SCAN1, and SCAN2. In each of the above assigned names, the number indicates the associated byte. Therefore, IVAL0, PCEND0, and NEND0 are associated with the first of the eight contiguous instruction bytes (i.e. byte 0). Similarly, IVAL1, PCEND1, and NEND1 are associated with the second of the eight contiguous instruction bytes (i.e. byte 1), etc. SCAN0 is the scan value indicating the first valid instruction within the eight contiguous instruction bytes. Similarly, SCAN1 is the scan value indicating the second valid instruction within the eight contiguous instruction bytes, etc.

For this example, the start byte and end byte information indicates the following values:

|  | Byte position<br>01234567 |
|---|---|
| Start byte information: | 10011110 |
| End byte information: | 00111101 |

In this embodiment, the start byte information and end byte information comprises a bit for each byte. If the bit is set, the corresponding byte is a start (or end) byte. If the bit is clear, the corresponding byte is not a start (or an end) byte. Therefore, for this example the first valid instruction begins at byte 0 and ends at byte 2. The second valid instruction begins and ends at byte 3 (therefore, the second valid instruction is a single byte). Similarly, the third valid instruction begins and ends at byte 4 and the fourth valid instruction begins and ends at byte 5. Finally, the fifth valid instruction begins at byte 6 and ends at byte 7. The correct scan bus values for this example would be:

|  | Byte position<br>01234567 |
|---|---|
| SCAN0 | 11100000 |
| SCAN1 | 00010000 |
| SCAN2 | 00001000 |

When the aforementioned start and end byte values are conveyed to first scan block 58, IVAL generation subunit 156 generates eight instruction valid values as described above. IVAL0 generates binary ones beginning at the occurrence of the first previous start byte to byte 0 (i.e. byte 0 itself) and ending in byte 0. Bits to the left of the assumed end byte position are set to zero. IVAL1 generates binary ones beginning at the occurrence of the first previous start byte (again at byte 0) and ending at byte 1. IVAL4 generates binary ones beginning at the first previous start byte (now at byte 4) and ending at byte 4. A "previous start byte" comprises a byte corresponding to a set start bit. The set start bit may be at the byte assumed to be the end byte, or the set start bit may correspond to a byte prior to the assumed end byte. A list of the generated instruction valid values is shown below.

|  | Mask bit positions<br>01234567 |
|---|---|
| IVAL0 | 10000000 |
| IVAL1 | 11000000 |
| IVAL2 | 11100000 |
| IVAL3 | 00010000 |
| IVAL4 | 00001000 |
| IVAL5 | 00000100 |
| IVAL6 | 00000010 |
| IVAL7 | 00000011 |

PCEND generation subunit 160 generates intermediate end counts according to the scan regions defined above. Therefore, PCEND0 contains a zero end count since no bytes precede PCEND0. PCEND3, however, contains a count of one since byte 2 is an end byte within the current scan region and no other end bits occur in the current scan region prior to byte 3. The values for the intermediate instruction end counts are shown below for this example:

|  | Instruction<br>count value<br>012 |  |
|---|---|---|
| PCEND0 | 100 | first scan region |
| PCEND1 | 100 | second scan region |
| PCEND2 | 100 |  |
| PCEND3 | 010 |  |
| PCEND4 | 010 | third scan region |
| PCEND5 | 001 |  |
| PCEND6 | 000 |  |
| PCEND7 | 000 | fourth scan region |

NEND generation subunit 164 receives the intermediate instruction end counts and generates the instruction end counts. Since the counts for the first and second scan regions already contain information about each end byte prior to the associated position (the counts in the second scan region include the last and only byte of the first scan region), these counts are unchanged by NEND generation subunit 164. The intermediate instruction counts in the third region (i.e. PCEND4, PCEND5, and PCEND6) provide shift amounts for the count in PCEND3. In this example, PCEND3 contains a count of one, PCEND4 a count of one, PCEND5 a count of two, and PCEND6 a count of three or more. Therefore, NEND4 conveys PCEND3 shifted by one (i.e. two), NEND5 conveys PCEND3 shifted by two (i.e. three or more), and NEND6 conveys PCEND3 shifted by three (i.e. three or more, three binary zeros upon NEND6). NEND7 conveys NEND6 shifted by three (the amount on PCEND7). This causes NEND7 to convey a value of 3 binary zeros, indicative of three or more end bits prior to byte 7. The values for each instruction end count are shown below for this example:

|  | Instruction count value 012 |
|---|---|
| NEND0 | 100 |
| NEND1 | 100 |
| NEND2 | 100 |
| NEND3 | 010 |
| NEND4 | 001 |
| NEND5 | 000 |
| NEND6 | 000 |
| NEND7 | 000 |

Scan bus generation subunit 168 receives the NEND and IVAL values shown above as its instruction end counts and instruction valid values along with the original end byte information, as noted above. Scan bus generation subunit 168 then generates its three scan values from the received values. Since byte two is an end byte and its associated instruction end count (NEND2) is zero, the instruction valid value associated with byte two (IVAL2) is selected as SCAN0. Byte three is also an end byte, and its associated instruction end count (NEND3) is one. Therefore, the instruction valid value associated with byte three (IVAL3) is selected as SCAN1. Similarly, IVAL4 is selected as SCAN2. Therefore, the final scan values are shown below and equal the expected results for the example:

|  | Byte position 01234567 |
|---|---|
| SCAN0 | 11100000 |
| SCAN1 | 00010000 |
| SCAN2 | 00001000 |

The preceding example contained a full complement of three valid instructions. The following example contains two valid instructions, and will be presented in tabular format below.

|  | Byte position 01234567 |
|---|---|
| Start byte information: | 10010000 |
| End byte information: | 00100010 |

Therefore, the expected scan bus results would be:

|  | Byte position 01234567 |
|---|---|
| SCAN0 | 11100000 |
| SCAN1 | 0001111 |
| SCAN2 | 0000000 |

The instruction valid values generated by IVAL generation subunit 156 with this example of end byte information are:

|  | Instruction count value 012 |  |
|---|---|---|
| PCEND0 | 100 | first scan region |
| PCEND1 | 100 | second scan region |
| PCEND2 | 100 |  |
| PCEND3 | 010 |  |
| PCEND4 | 100 | third scan region |
| PCEND5 | 100 |  |
| PCEND6 | 100 |  |
| PCEND7 | 010 | fourth scan region |

The intermediate instruction end counts generated by PCEND generation subunit 160 according to this example's end byte information are:

|  | Mask bit positions 01234567 |
|---|---|
| IVAL0 | 10000000 |
| IVAL1 | 11000000 |
| IVAL2 | 11100000 |
| IVAL3 | 00010000 |
| IVAL4 | 00011000 |
| IVAL5 | 00011110 |
| IVAL6 | 00011110 |
| IVAL7 | 00011111 |

The instruction end counts generated by NEND generation subunit 164 according to this examples PCEND values would then be:

|  | Instruction count value 012 |
|---|---|
| NEND0 | 100 |
| NEND1 | 100 |
| NEND2 | 100 |
| NEND3 | 010 |
| NEND4 | 010 |
| NEND5 | 010 |
| NEND6 | 010 |
| NEND7 | 001 |

Therefore, since byte 2 is an end byte and NEND2 indicates zero previous end bytes, SCAN0 is selected to be IVAL2. Byte 6 is an end byte and NEND6 indicates one previous end byte, so SCAN1 is selected to be IVAL6. There are no other start bits, so SCAN2 is selected to be zero.

|  | Byte position 01234567 |
|---|---|
| SCAN0 | 11100000 |
| SCAN1 | 00011110 |
| SCAN2 | 00000000 |

Figure 5:
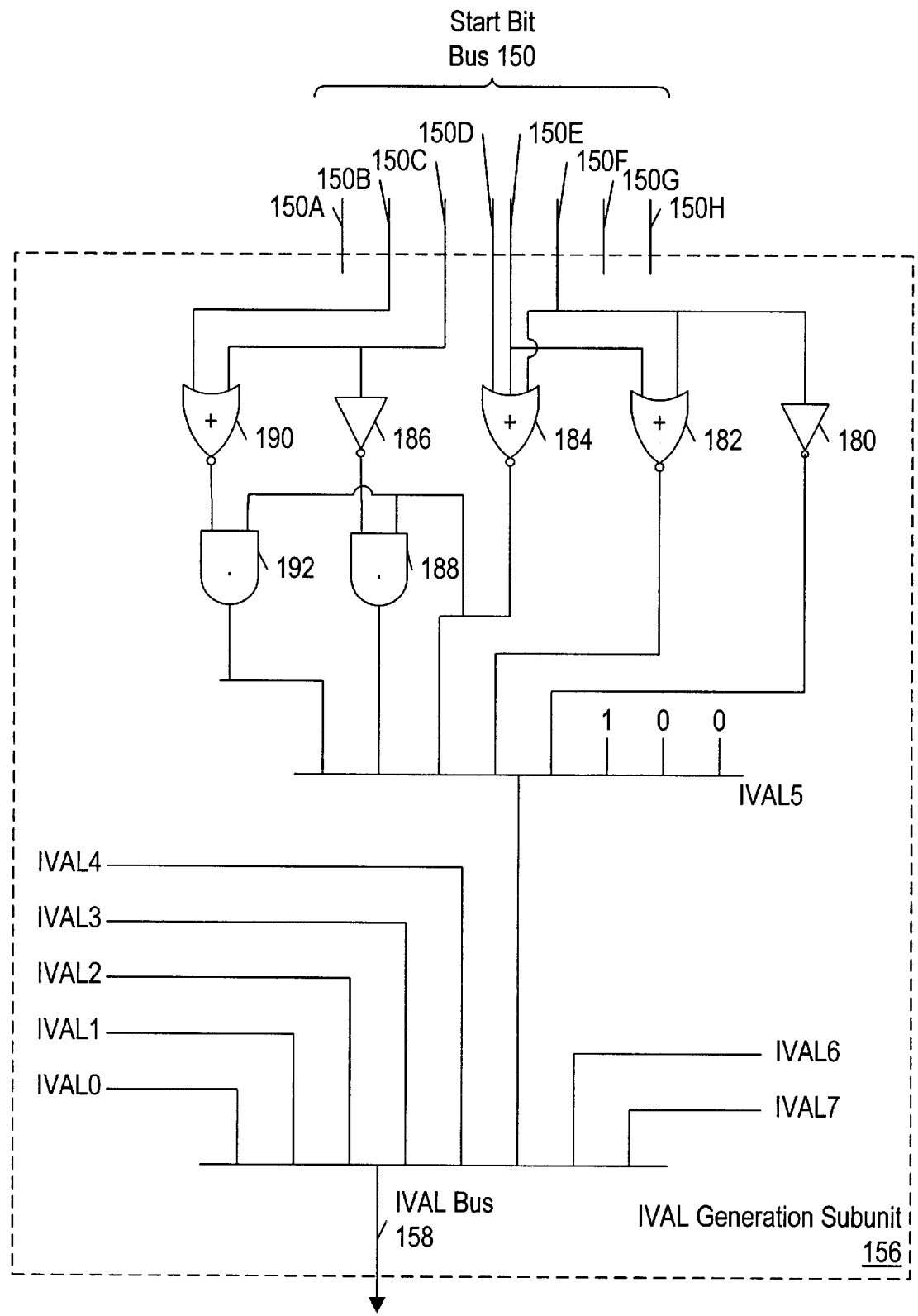
FIG. 5 is a logic diagram of one embodiment of portions of an IVAL generation subunit shown in FIG. 4.

Turning next to FIGS. 5 through 8, exemplary logic diagrams of portions of the subunits shown in FIG. 4 are shown. FIG. 5 shows an exemplary logic diagram of a portion of IVAL generation subunit 156. Exemplary logic circuits for the generation of IVAL5 are shown. IVAL5 is a portion of IVAL bus 158 conveying the instruction valid value associated with the sixth of the eight contiguous instruction bytes. Other logic circuits (not shown) generate the instruction valid values associated with the other instruction bytes. The instruction valid values for these bytes are conveyed on IVAL0 through IVAL4, IVAL6, and IVAL7. The values conveyed on IVAL0 through IVAL7 form IVAL bus 158, as shown in FIG. 5.

Scan start bit bus 150 is shown as eight conductors 150A–150H in FIG. 5, indicative of the eight contiguous instruction bytes scanned by this embodiment of first scan block 58. Conductor 150A conveys the start bit for the first of the eight contiguous instruction bytes (referred to as byte 0), conductor 150B conveys the start bit for the second of the eight contiguous instruction bytes (referred to as byte 1), etc. An examination of the exemplary circuits shows that a particular bit for an instruction valid value is generated as the logical NOR of the start bits between the byte subsequent to the byte associated with the particular bit and the byte assumed to be the end bit, inclusive. Therefore, the bit five of IVAL5 is a constant one (since there are no start bits to examine). Furthermore, the bit 4 of IVAL5 is the inverted start bit for byte 5 (i.e. the logical NOR of a single bit is an inversion). Bit 3 of IVAL5 is the NOR of the start bits for bytes 4 and 5, etc.

Inverter 180 provides bit 4 of IVAL5, and NOR gate 182 provides the bit 3 of IVAL5. The NOR function for the bit 2 of IVAL5 is provided by NOR gate 184, while NOR gate 184, inverter 186, and AND gate 188 provide the NOR function for the bit 1 of IVAL5. Similarly, bit 0 of IVAL5 is generated from NOR gate 184, NOR gate 190, and AND gate 192. Note that bits 6 and 7, constant zeros, may be omitted from IVAL5.

Figure 6:
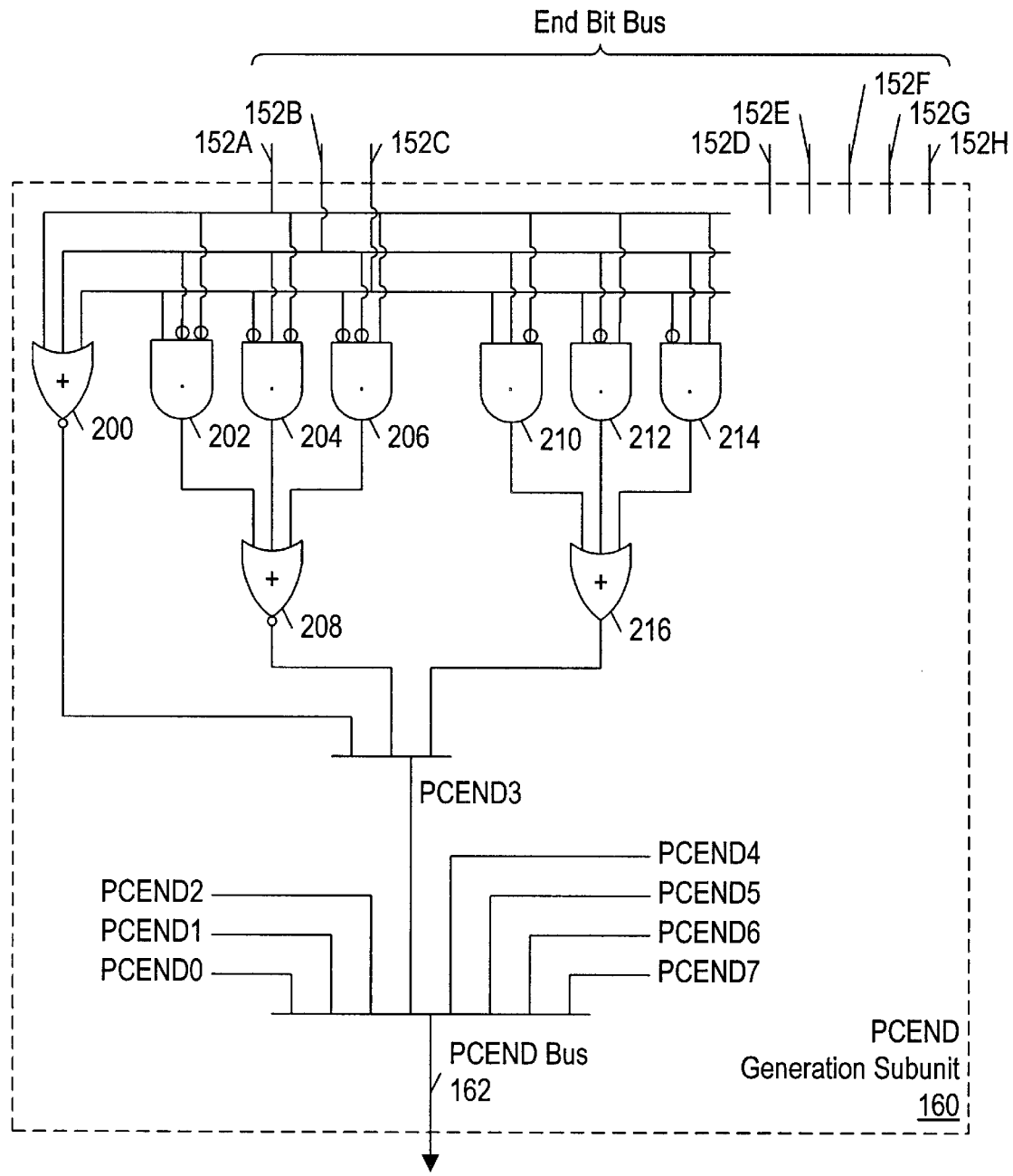
FIG. 6 is a logic diagram of one embodiment of portions of a PCEND generation subunit shown in FIG. 4.

Turning now to FIG. 6, exemplary logic circuits forming a portion of PCEND generation subunit 160 are shown. PCEND generation subunit 160 receives scan end bit bus 152. Scan end bit bus 152 is shown in FIG. 6 as eight separate conductors which convey the eight end bits associated with the region of contiguous instruction bytes being scanned. Conductor 152A conveys the end bit associated with the first of the contiguous bytes (referred to as byte 0), conductor 152B conveys the end bit associated with the second of the contiguous bytes (referred to as byte 1), etc.

FIG. 6 shows exemplary logic circuits for generating PCEND3. PCEND3 is the intermediate instruction end count for byte 3 (i.e. the fourth byte) of the eight contiguous bytes. Other logic circuits (not shown) generate intermediate instruction end counts for other bytes within the contiguous instruction bytes scanned by first scan block 58. For the following discussion with respect to FIG. 6, the term "previous end bit" refers to an end bit within the scan region associated with a particular intermediate instruction end count and to the end bit associated with the last byte of the previous scan region.

In this embodiment, each intermediate instruction end count and each instruction end count are decoded values. The first bit, when set, indicates that zero end bytes exist prior to the current byte. The second bit, when set, indicates that one end byte exists prior to the current byte, etc. Therefore, for intermediate end count generation, the first bit is set if none of the previous end bits are set. This is a NOR function of the associated previous end bits, and is shown as NOR gate 200.

The second bit of an intermediate instruction end count indicates one previous end bit is set. Therefore, an AND/OR network may provide the value where each of the input terminals of the AND gate are inverted except for one. In this manner, if one and only one previous end bit is set, then the resulting intermediate instruction end count bit will be set. This function is provided by AND gate 202, AND gate 204, AND gate 206, and OR gate 208.

Two previous end bits being set is indicated by setting bit two of the intermediate instruction end counts. An AND/OR network similar to the network for bit 1 may provide the value, except that two of the input terminals of the AND gates are not inverted. In this manner, if any two previous end bits are set but no more than two are set, then the resulting intermediate instruction end count bit will be set. AND gate 210, AND gate 212, AND gate 214, and OR gate 216 provide this function for the embodiment shown in FIG. 6 for PCEND3.

Figure 7:
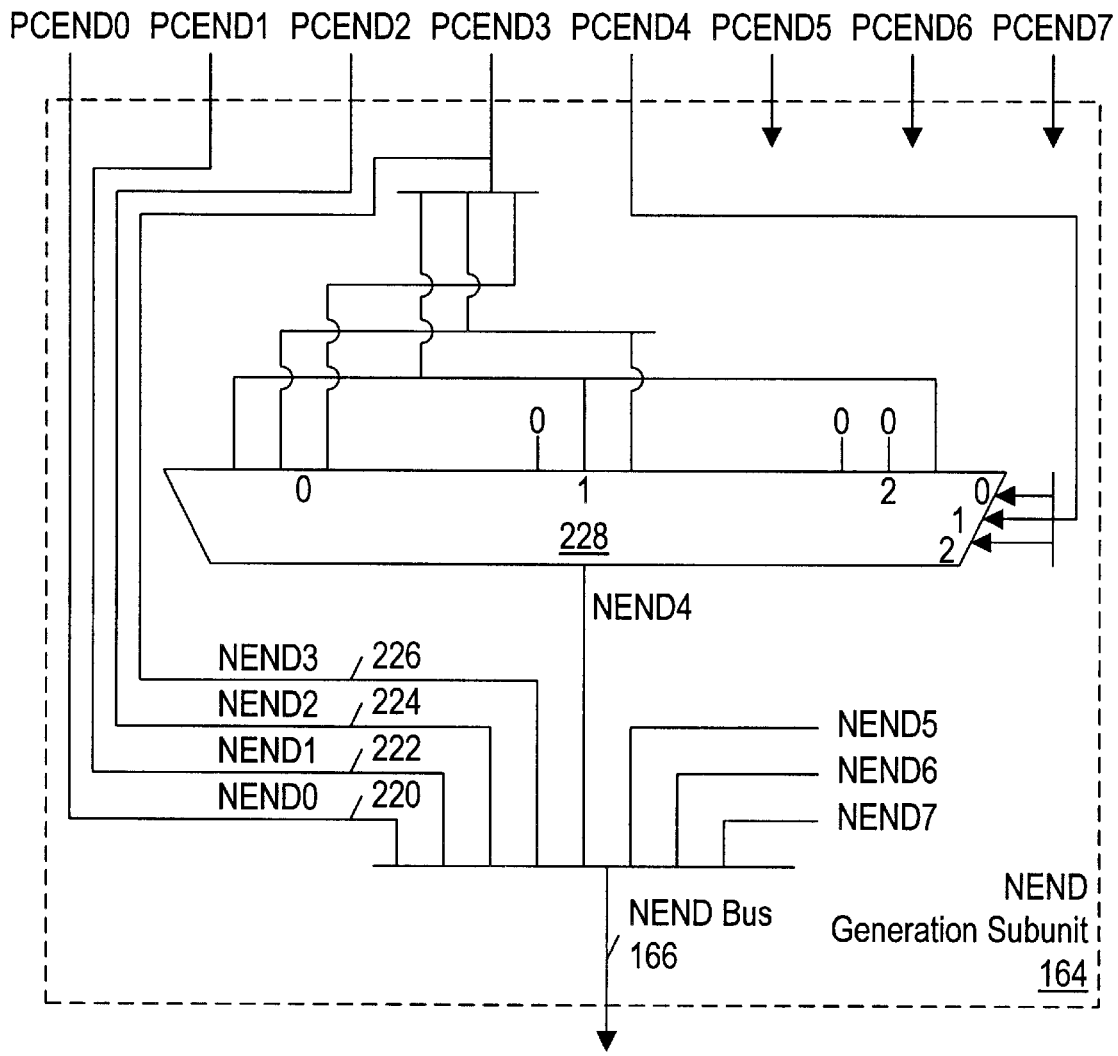
FIG. 7 is a logic diagram of one embodiment of portions of an NEND generation subunit shown in FIG. 4.

Turning now to FIG. 7, exemplary logic circuits for a portion of an embodiment of NEND generation subunit 164 are shown. The generation of the instruction end count associated with byte four (i.e. the fifth byte) of the plurality of contiguous instruction bytes scanned by first scan block 58 is depicted (referred to as NEND4). As noted above, the instruction end counts for the first two scan regions are unmodified from the intermediate instruction end counts. These unmodified counts are shown in FIG. 7 as buses 220, 222, 224, and 226, respectively. As noted above, NEND4 is PCEND3 shifted by the value generated on PCEND4. Multiplexor 228 is configured to provide this shifting. If the first bit of PCEND4 is set, indicating zero previous end bits, then port 0 of multiplexor 228 will be selected and NEND4 will be equal to PCEND3. If, however, the second bit of PCEND4 is set indicating one previous end bit, then port 1 of multiplexor 228 will be selected and NEND4 will be equal to PCEND3 shifted by one value. Port 2 of multiplexor 228 are operated similarly with respect to the third bit of PCEND4. Circuits for generating NEND5, NEND6, and NEND7 are configured similarly. It is noted that NEND7 selects a shifting of NEND6, not PCEND6.

Figure 8:
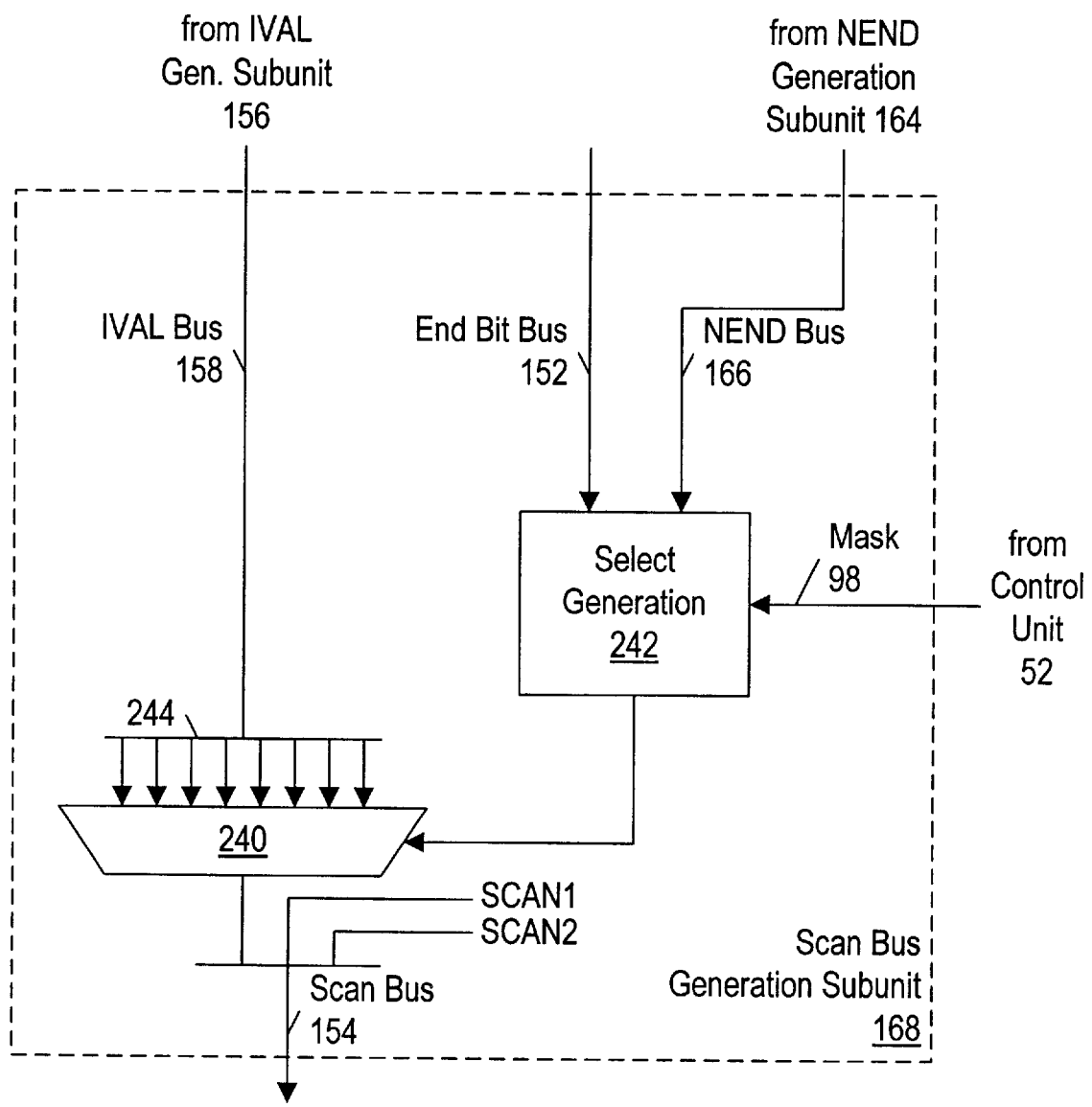
FIG. 8 is a logic diagram of one embodiment of portions of a Scan Bus generation subunit shown in FIG. 4.

Turning next to FIG. 8, exemplary logic circuits for a portion of one embodiment of scan bus generation subunit 168 are depicted. In particular, logic circuits suitable for generating the first scan bus value (SCAN0) are shown. Multiplexor 240 is coupled to each instruction valid value generated by IVAL generation subunit 156. The corresponding end bits are received on scan end bit bus 152, and the corresponding instruction end counts are received on NEND bus 166.

As noted above, an instruction valid value is selected as SCAN0 if the corresponding end bit on scan end bit bus 152 is set and the corresponding instruction end count indicates that there are no previous instruction ends found within the region of contiguous instruction bytes scanned by first scan block 58. Therefore, an AND function of the corresponding end bit and the first bit of the corresponding instruction end count provides each select signal for multiplexor 460. Select generation block 242 provides this ANDing function. Similar selection generation blocks may be used to select the instruction valid value for the second scan bus value (SCAN1) and the third scan bus value (SCAN2). SCAN0, SCAN1, and SCAN2 are conveyed on scan bus 154.

Because only a portion of the region of instruction bytes being scanned by first scan block 58 may be being dispatched (based upon the start pointer and end pointer provided), select generation block further receives the mask upon mask bus 98. A particular instruction valid value is selected by select generation block 242 if the corresponding end bit and end count are as listed above and the corresponding mask bit from mask bus 98 is set. It is noted that the end bits received upon scan end bits bus 152 are masked with the mask from mask bus 98 prior to performing instruction end count generation as well.

It is noted that FIGS. 5–8 have used a standard symbol for combining bus conductors into a single bus or for splitting bus conductors from a single bus. For example, horizontal line 244 of FIG. 8 is an indication that eight IVAL buses (IVAL0–IVAL7) form IVAL bus 158. These symbols have been included to keep the drawings uncluttered to facilitate understanding. These symbols should not be construed to indicate any physical device. As will be appreciated by those skilled in the art, a bus is simply a collection of conductors which are logically grouped together to form a value.

It is further noted that the above discussion described an embodiment of first scan block 58 which scans eight contiguous instruction bytes for up to three instructions. Other embodiments may vary the number of contiguous instruction bytes as well as the maximum number of instructions scanned for. FIGS. 5–8 are also exemplary embodiments of first scan block 58. Many other embodiments are possible and specifically contemplated. Still further, bytes within the set of instruction bytes received by instruction scanning unit 50 have been described as being ordered via such terms as "prior to", "before", "first", "second", etc. A byte is prior to another byte if it is stored in a memory location of main memory which is numerically smaller than the other byte. The terms before, first, second, etc. should be similarly construed.

Figure 9:
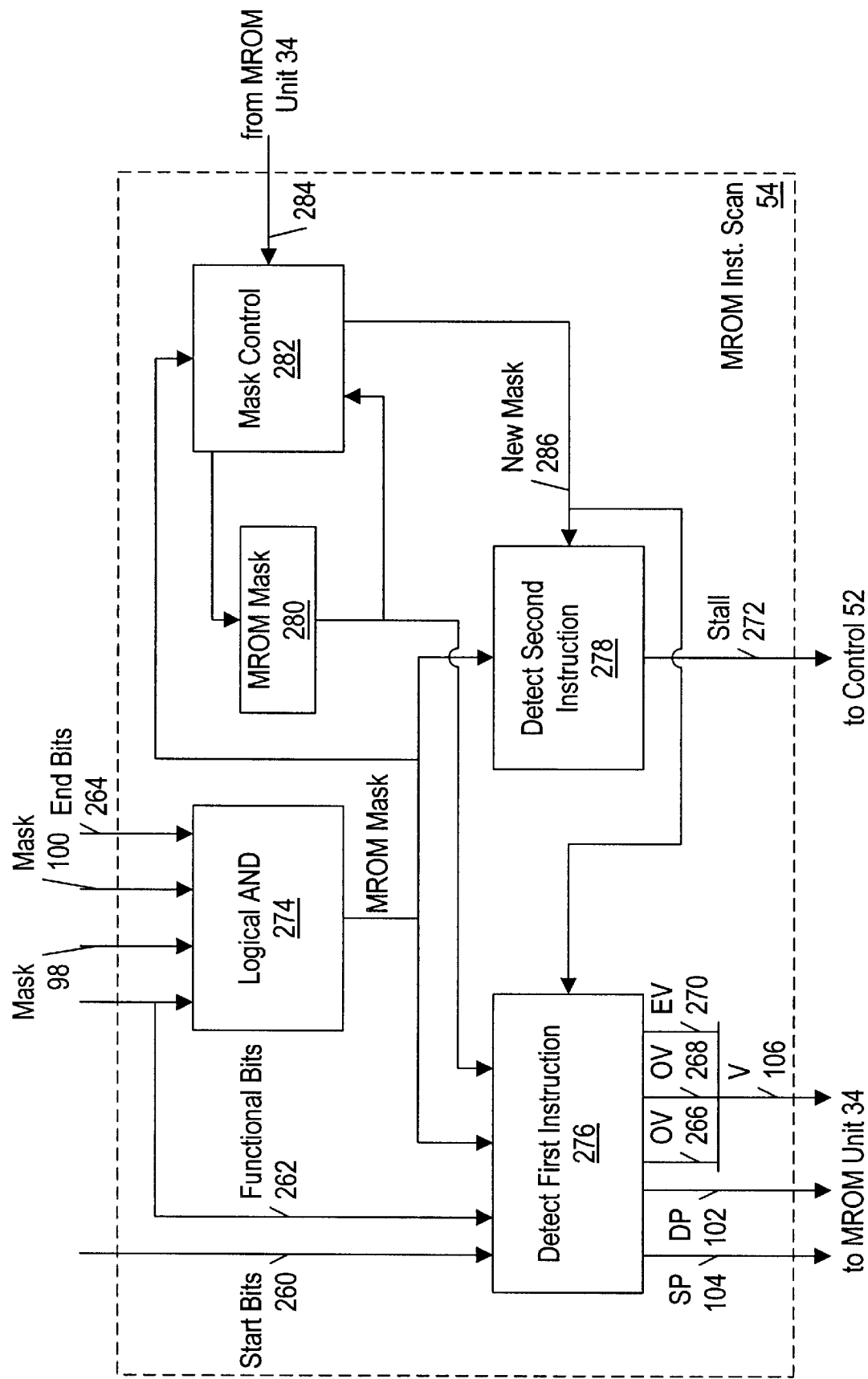
FIG. 9 is a block diagram of one embodiment of an MROM instruction scan unit shown in FIG. 3.

Turning now to FIG. 9, a block diagram of one embodiment of MROM instruction scan unit 56 is shown. MROM instruction scan unit 56 receives start bits 82 upon a start bits bus 260, functional bits 80 upon a functional bits bus 262, and end bits 84 upon an end bits bus 264. Start bits bus 260, functional bits bus 262, and end bits bus 264 are configured to convey the start, functional, and end bits corresponding to the set of bytes represented in register 62. MROM instruction scan unit 56 additionally receives the masks from control unit 52 upon mask buses 98 and 100. MROM instruction scan unit 56 provides a start pointer of an MROM instruction upon MROM start pointer bus 104, an opcode pointer of an MROM instruction upon MROM opcode pointer bus 102, and a set of valid bits upon MROM valid bus 106. In the embodiment shown, the set of valid bits includes an opcode pointer valid bit 266, a start pointer valid bit 268, and end valid bit 270. Still further, MROM instruction scan unit 56 provides a stall signal upon a stall line 272 to control unit 52. The stall signal is asserted if MROM instructions reside within the set of instruction bytes which have yet to be dispatched to MROM unit 34.

In the embodiment of FIG. 9, MROM instruction scan unit 56 includes a logical AND block 274, a first instruction detection block 276, a second instruction detection block 278, an MROM mask storage 280, and a mask control block 282. Logical AND block 274 creates an MROM mask upon receipt of a set of functional bits and a set of end bits from register 62. Logical AND block 274 ANDs each of the functional bits with the corresponding end bit and the corresponding bit from the masks provided upon mask buses 98 and 100. The MROM mask thus created therefore includes a binary one digit for a byte position if the end bit is set for that byte position, the functional bit is set for that byte position, and the mask bit from control unit 52 is set for that byte position. Since the functional bit being set at the end byte of the instruction indicates an MROM instruction, a binary one digit indicates that an MROM instruction ends at the corresponding byte position. Including the mask bits from control unit 52 in the logical ANDing excludes MROM instructions which are not within the bytes being dispatched from the set of bytes, such that MROM instruction scan unit 56 detects only those MROM instructions actually to be dispatched.

The MROM mask thus created is provided to first instruction detection block 276 and second instruction detection block 278 (which are coupled to logical AND block 274 to receive the MROM mask). First instruction detection block 276 scans the MROM mask to determine the position of the first MROM instruction (in program order) within the set of instruction bytes. Upon locating the first MROM instruction, if any, first instruction detection block 276 forms a start pointer from the start bits received upon start bits bus 260. In particular, the start pointer indicates the nearest prior byte position to the end of the MROM instruction for which the start bit is set (i.e. the start of the MROM instruction). Additionally, by examining the pattern of functional bits prior to the end byte of the detected MROM instruction, the opcode byte can be determined (i.e. the byte prior to the end of the MROM instruction at which a transition from a binary zero to a binary one in the functional bits occurs, or the start byte of the MROM instruction if the functional bit at the start byte is set). The opcode pointer is thereby formed and conveyed upon MROM opcode pointer bus 102. Finally, first instruction detection block 276 determines the appropriate valid bits for the MROM instruction.

The valid bits are determined based upon whether or not the entire MROM instruction is contained within the set of bytes being scanned. If the entire MROM instruction is contained within the set, then the start pointer, the opcode pointer, and the end of the instruction are located concurrently and all three of the valid bits are set (e.g. the opcode pointer valid bit 266, the start pointer valid bit 268, and the end valid bit 270 are all set). However, if a portion of the MROM instruction lies within one set of instruction bytes and the remaining portion within another set of instruction bytes (a "split line" instruction), then the MROM instruction is dispatched during two different clock cycles to MROM unit 34. The two clock cycles in which the split line instruction is dispatched to MROM unit 34 may be separated by one or more clock cycles if scan blocks 58 and 60 require more clock cycles to dispatch instructions from the set of instruction bytes containing the first portion of the MROM instruction than MROM instruction scan unit 56 requires to dispatch the MROM instructions within the set of instruction bytes. During the first clock cycle, at least the start pointer is conveyed. The opcode pointer may or may not be conveyed with the start pointer, depending upon which set of instruction bytes the opcode is stored in. The end of the MROM instruction is dispatched in the second clock cycle. Valid bits 266–270 serve to indicate to MROM unit 34 which of the MROM information is conveyed during each clock cycle.

According to one embodiment, the functional bits include an extra bit not associated with any byte position within the set of instruction bytes. The extra bit indicates, when set, that an instruction beginning within the set of instruction bytes and ending in the subsequent set of instruction bytes is an MROM instruction. First instruction detection unit 276 uses the extra bit to determine if the split line instruction is MROM or fast path. Detection of the start byte and the opcode byte are performed in a manner similar to non-split line instructions. Since each value associated with a particular MROM instruction has a dedicated valid bit, the split line instruction may be dispatched in two portions as described.

In parallel with first instruction detection block 276, second instruction detection block 278 detects a second MROM instruction within the set of instruction bytes from the MROM mask. If a second MROM instruction is detected (including a split-line MROM instruction), then MROM instruction scan unit 56 requires at least one additional clock cycle to dispatch the second MROM instruction. Second instruction detection block 276 asserts the stall signal upon stall line 272 to control unit 52, thereby informing control unit 52 that MROM instructions remain to be dispatched to MROM unit 34. It is noted that second instruction detection block 278 may receive the full signal upon full line 284 (described below), to thereby assert the stall signal during clock cycles in which MROM unit 34 cannot accept instructions and the modified MROM mask indicates that at least one MROM instruction remains to be dispatched. Alternatively, control unit 52 may receive the full signal directly.

Mask control block 282 is coupled to receive the MROM mask from logical AND block 274 as well. Mask control block 282 resets the first binary one within the MROM mask if a full signal upon a full line 284 is deasserted during the clock cycle. The full signal indicates that MROM unit 34 is buffering the maximum number of MROM instructions for which it is designed, and cannot accept additional MROM instructions until at least one MROM instruction is dispatched from MROM unit 34 to decode units 20. The modified mask is stored into MROM mask storage 280, which is coupled to first instruction detection block 276 and second instruction detection block 278. First instruction block 276 and second instruction block 278 process the modified MROM mask until all MROM instructions indicated by the modified MROM mask have been dispatched to MROM unit 34. Mask control unit 282 asserts a new mask signal upon a new mask line 286 to first instruction detection block 276 and second instruction detection block 278, informing the blocks that they should accept a new MROM mask from logical AND block 274 during the clock cycle. If the new mask signal is deasserted, then the modified MROM mask from MROM mask storage 280 is analyzed by first instruction detection block 276 and second instruction detection block 278.

Figure 10:
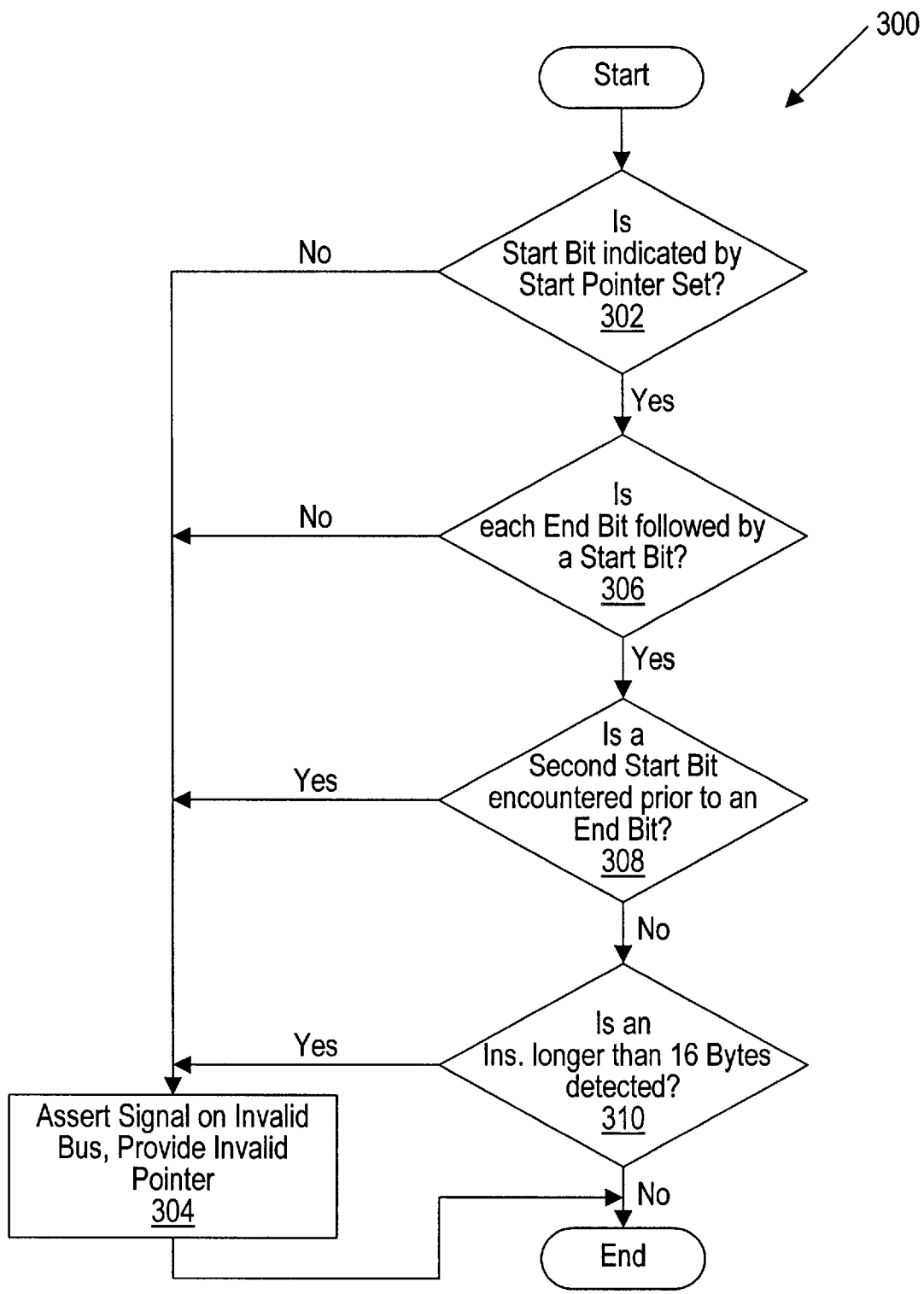
FIG. 10 is a flow chart depicting the activities of one embodiment of an invalid instruction scan unit shown in FIG. 3.

Turning next to FIG. 10, a flow chart 300 depicting operation of one embodiment of invalid instruction scan unit 54 is shown. Flow chart 300 includes checks selected to detect any invalid predecode data, thereby verifying that the scan values provided by scan blocks 58 and 60 and the MROM instructions dispatched by MROM instruction scan unit 56 are correct. The start bits and end bits scanned by invalid instruction scanning unit 54 are masked by the masks generated by control unit 52 and provided upon mask buses 98 and 100.

As indicated by step 302, invalid instruction scan unit 54 checks the start bit corresponding to the byte indicated by the start pointer. If the start bit is clear, then a first case of invalid predecode data is detected. Invalid instruction scan unit 54 asserts a signal upon invalid bus 110 indicating that the start bit at the start pointer is clear, and provides the start pointer upon invalid pointer bus 108 (step 304). Alternatively, if the start bit corresponding to the byte indicated by the start pointer is set, then the predecode data is valid with respect to this check.

For each end bit within the predecode data which is set, invalid instruction scan unit 54 checks the start bit corresponding to the byte immediately subsequent to that end byte (as indicated by the end bit) to ensure that the start bit is set (step 306). If the start bit is not set, then a second case of invalid predecode data is detected. Invalid instruction scan unit 54 performs step 304, providing a signal upon invalid bus 110 indicating the error detected and providing a pointer to the byte for which the start bit should be set upon invalid pointer bus 108. Invalid instruction scan unit 54 may store an indication of the end bit for the last byte within the set of bytes in order to detect a case where the last byte of the set of instruction bytes is the end of an instruction (and therefore the first byte of the next set of instruction bytes scanned should be a start byte). For this case, the invalid instruction pointer would indicate the first byte of the next set of instruction bytes if that byte is not indicated to be a start byte.

Invalid instruction scan unit 54 additionally detects a second start bit being encountered prior to detection of the end bit corresponding to a first start bit (step 308). Such a check may be performed by creating instruction valid values based on the start bits (similar to IVAL bus 158), and combining instruction valid values corresponding to each end bit within the line. If the value thus formed does not include a binary one bit for each byte within the set of bytes being dispatched (excluding those bytes masked off by the masks provided upon mask buses 98 and 100), then a third case of invalid predecode data is detected. The invalid instruction pointer is set to indicate the first start bit for which the second start bit is detected prior to the end bit, and a signal is asserted upon invalid bus 110. Invalid instruction scan unit 54 stores an indication of a start bit being located within a set of bytes without a detection of a corresponding end bit (i.e. a split line instruction), in order to detect the second start bit before an end bit in the subsequent set of instruction bytes.

Finally, invalid instruction scan unit 54 detects a start bit for which an end byte is not located within the subsequent 15 bytes (step 310). Such an instruction is longer than that allowed by the x86 microprocessor architecture. Therefore, either the predecode data is invalid or the instruction is an invalid coding. The invalid instruction pointer is set to the start bit, and a signal is asserted upon invalid bus 110 indicating detection of the instruction which is too long.

Figure 11:
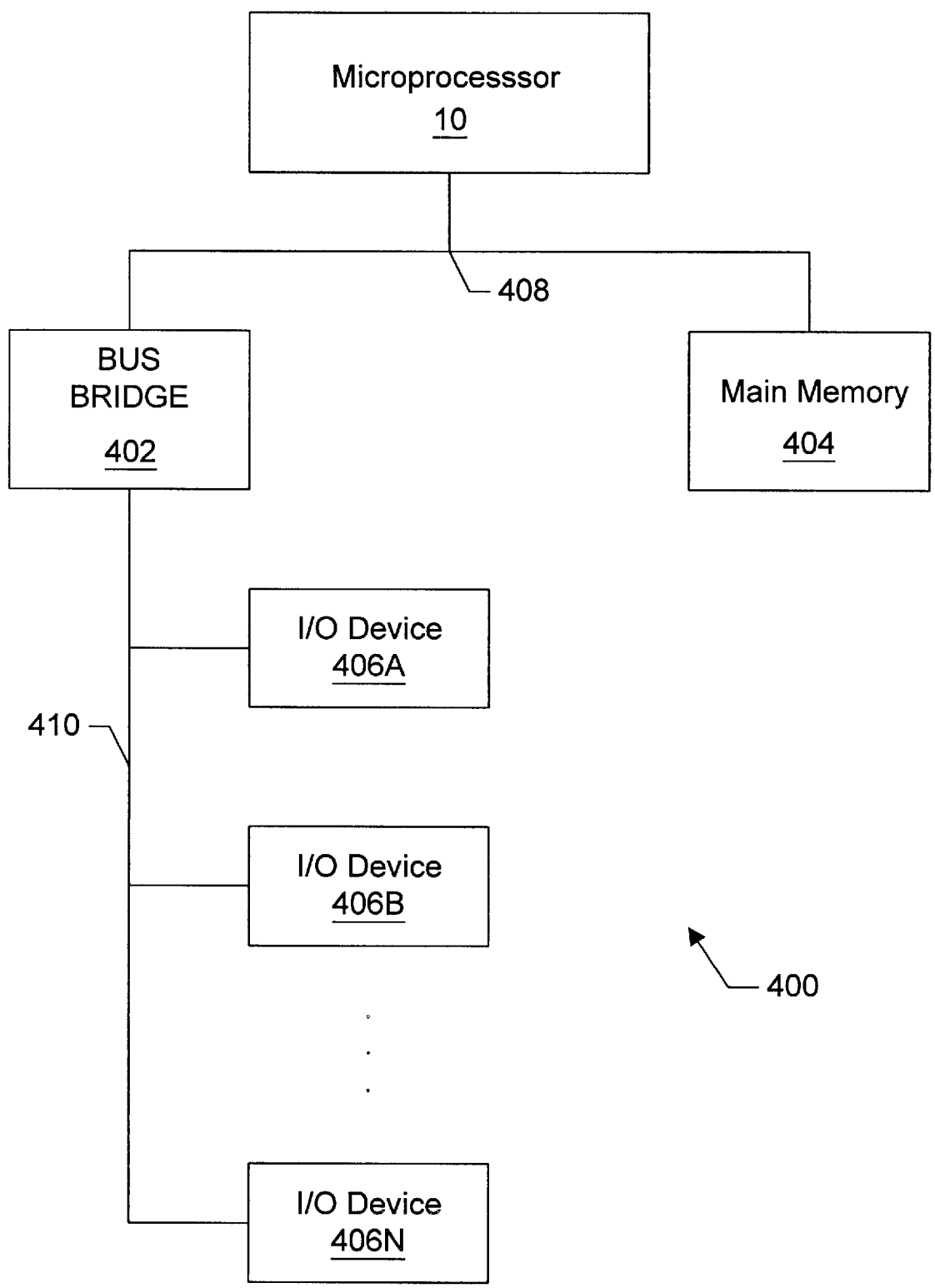
FIG. 11 is a block diagram of a computer system including the microprocessor shown in FIG. 1.

Turning now to FIG. 11, a computer system 400 including microprocessor 10 is shown. Computer system 400 further includes a bus bridge 402, a main memory 404, and a plurality of input/output (I/O) devices 406A–406N. Plurality of I/O devices 406A–406N will be collectively referred to as I/O devices 406. Microprocessor 10, bus bridge 402, and main memory 404 are coupled to a system bus 408. I/O devices 406 are coupled to an I/O bus 410 for communication with bus bridge 402.

Bus bridge 402 is provided to assist in communications between I/O devices 406 and devices coupled to system bus 408. I/O devices 406 typically require longer bus clock cycles than microprocessor 10 and other devices coupled to system bus 408. Therefore, bus bridge 402 provides a buffer between system bus 408 and input/output bus 410. Additionally, bus bridge 402 translates transactions from one bus protocol to another. In one embodiment, input/output bus 410 is an Enhanced Industry Standard Architecture (EISA) bus and bus bridge 402 translates from the system bus protocol to the EISA bus protocol. In another embodiment, input/output bus 410 is a Peripheral Component Interconnect (PCI) bus and bus bridge 402 translates from the system bus protocol to the PCI bus protocol. It is noted that many variations of system bus protocols exist. Microprocessor 10 may employ any suitable system bus protocol.

I/O devices 406 provide an interface between computer system 400 and other devices external to the computer system. Exemplary I/O devices include a modem, a serial or parallel port, a sound card, etc. I/O devices 406 may also be referred to as peripheral devices. Main memory 404 stores data and instructions for use by microprocessor 10. In one embodiment, main memory 404 includes at least one Dynamic Random Access Memory (DRAM) and a DRAM memory controller.

It is noted that although computer system 400 as shown in FIG. 11 includes one bus bridge 402, other embodiments of computer system 400 may include multiple bus bridges 402 for translating to multiple dissimilar or similar I/O bus protocols. Still further, a cache memory for enhancing the performance of computer system 400 by storing instructions and data referenced by microprocessor 10 in a faster memory storage may be included. The cache memory may be inserted between microprocessor 10 and system bus 408, or may reside on system bus 408 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |

TABLE 1-continued x86 Fast Path, Double Dispatch, and MROM Instructions

| X86 Instruction | Instruction Category |
|---|---|
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | NROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |

TABLE 1-continued x86 Fast Path, Double Dispatch, and MROM Instructions

| X86 Instruction | Instruction Category |
|---|---|
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

In accordance with the above disclosure, a parallel and scaleable instruction scanning unit has been described. The instruction scanning unit scans predecode data from multiple regions of an instruction cache line in parallel, thereby locating multiple instruction concurrently for dispatch. In parallel with scanning for instructions, the predecode data is scanned for validity and for MROM instructions for dispatch to an MROM unit.

Numerous variations and modifications will become apparent to those skilled in the art once the above disclosure is fully appreciated. It is intended that the following claims be interpreted to embrace all such variations and modifications.

What is claimed is:

1. An instruction scanning unit for scanning a block of predecode information associated with a plurality of contiguous instruction bytes wherein said block of predecode information includes start byte information indicative of bytes which start instructions and wherein said block of predecode information further includes end byte information indicative of bytes which end instructions, said instruction scanning unit comprising:

a first subunit coupled to receive said start byte information, and wherein said first subunit is configured to generate a plurality of instruction valid values, and wherein each of said plurality of instruction valid values is indicative of a potential valid instruction starting at a first byte within said plurality of contiguous instruction bytes and ending at a second byte within said plurality of contiguous instruction bytes, and wherein said first byte is indicated to be a start byte by said start byte information, and wherein said second byte is different for each one of said plurality of instruction valid values; and a second subunit coupled to receive said end byte information, and wherein said second subunit is configured to generate a plurality of instruction end counts, and wherein each of said instruction end counts is indicative of a number of instructions which end between a first one of said plurality of contiguous instruction bytes and a particular one of said plurality of contiguous instruction bytes, and wherein said first subunit and said second subunit operate in parallel.

2. The instruction scanning unit as recited in claim 1 further comprising a third subunit coupled to receive said end byte information, said plurality of instruction valid values, and said plurality of instruction end counts, wherein said third subunit is configured to select a plurality of scan bus values from said plurality of instruction valid values.

3. The instruction scanning unit as recited in claim 2 wherein said third subunit is configured to select said plurality of scan bus values according to said end byte information and said plurality of instruction end counts.

4. The instruction scanning unit as recited in claim 3 wherein a first of said plurality of instruction valid values is selected as a first of said plurality of scan bus values if said end byte information indicates that said second byte associated with said first of said plurality of instruction valid values is a byte in which an instruction ends and if a first of said plurality of instruction end counts indicates that zero instructions end prior to said second byte.

5. The instruction scanning unit as recited in claim 4 wherein a second of said plurality of instruction valid values is selected as a second of said plurality of scan bus values if said end byte information indicates that said second byte associated with said second of said plurality of instruction valid values is a byte in which an instruction ends and if a second of said plurality of instruction end counts indicates that one instruction ends prior to said second byte.

6. The instruction scanning unit as recited in claim 5 wherein a third of said plurality of instruction valid values is selected as a third of said plurality of scan bus values if said end byte information indicates that said second byte associated with said third of said plurality of instruction valid values is a byte in which an instruction ends and if a third of said plurality of instruction end counts indicates that two instructions end prior to said second byte.

7. The instruction scanning unit as recited in claim 1 wherein said each of said plurality of instruction valid values comprises a mask of binary zeros and binary ones, and wherein said binary ones are contiguous to each other.

8. The instruction scanning unit as recited in claim 7 wherein said binary ones are indicative of bytes which comprise said potential instruction.

9. The instruction scanning unit as recited in claim 1 wherein each of said plurality of instruction end counts is a value indicative of between zero and two instructions.

10. The instruction scanning unit as recited in claim 1 wherein said second subunit further comprises a pair of subunits, and wherein a first of said pair of subunits is coupled to receive said end byte information, and wherein a second of said pair of subunits is coupled to said first of said pair of subunits.

11. The instruction scanning unit as recited in claim 10 wherein said first of said pair of subunits is configured to generate a plurality of intermediate instruction end counts wherein each of said plurality of intermediate instruction end counts is indicative of a number of instructions which end between a third one of said plurality of contiguous instruction bytes and a fourth one of said plurality of contiguous instruction bytes.

12. The instruction scanning unit as recited in claim 11 wherein said second of said pair of subunits is configured to receive said plurality of intermediate instruction end counts and is configured to generate said plurality of instruction end counts.

13. A method for concurrently locating variable byte length instructions, comprising:

scanning start byte information corresponding to a plurality of contiguous bytes to create a plurality of instruction valid values, wherein each of said plurality of instruction valid values is indicative of a potential valid instruction beginning at a first of said plurality of contiguous bytes and ending at a second of said plurality of contiguous bytes, and wherein said first of said plurality of contiguous bytes is identified by said start byte information to be a start byte; and selecting one of said plurality of instruction valid values, wherein said second one of said plurality of contiguous bytes corresponding to said one of said plurality of instruction valid values is identified by end byte information corresponding to said plurality of instruction valid values to be an end byte.

14. The method as recited in claim 13 wherein said selecting comprises:

forming a plurality of instruction end counts, wherein each of said plurality of instruction end counts is indicative of a number of instructions ending between an initial one of said plurality of contiguous instruction bytes and a third one of said plurality of contiguous instruction bytes; and identifying said one of said plurality of instruction valid values having a corresponding one of said plurality of instruction end counts equal to zero.

15. The method as recited in claim 13 further comprising selecting a second one of said plurality of instruction valid values, wherein said second one of said plurality of contiguous bytes corresponding to said second one of said plurality of instruction valid values is identified by end byte information corresponding to said plurality of instruction valid values to be an end byte, and wherein said second one of said plurality of contiguous bytes corresponding to said second one of said instruction valid values is subsequent to said second one of said plurality of contiguous bytes corresponding to said one of said instruction valid values.

16. The method as recited in claim 15 further comprising selecting a third one of said plurality of instruction valid values, wherein said second one of said plurality of contiguous bytes corresponding to said third one of said plurality of instruction valid values is identified by end byte information corresponding to said plurality of instruction valid values to be an end byte, and wherein said second one of said plurality of contiguous bytes corresponding to said third one of said instruction valid values is subsequent to said second one of said plurality of contiguous bytes corresponding to said second one of said instruction valid values.

17. A microprocessor comprising:

an instruction cache configured to store instruction bytes and corresponding predecode data including start byte information indicative of which instruction bytes are start bytes of instructions and end byte information indicative of which instruction bytes are end bytes of instructions; and an instruction scanning unit coupled to receive said instruction bytes and said corresponding predecode data from said instruction cache, wherein said instruction scanning unit is configured to scan said start byte information to identify potential valid instructions, each potential valid instruction beginning at a first byte indicated by said start byte information to be a start byte and ending at a second byte which differs for each potential valid instruction, and wherein said instruction scanning unit is configured to scan said end byte information in parallel to generate an end count corresponding to each instruction byte, and wherein said instruction scanning unit is configured to identify a plurality of instructions from said potential valid instructions using said end counts.

18. The microprocessor as recited in claim 17 further comprising:

a plurality of fixed issue positions; and an instruction alignment unit coupled between said plurality of fixed issue positions and said instruction scanning unit, wherein said instruction alignment unit is configured to route each of said plurality of instructions from said instruction scanning unit to a different one of said plurality of fixed issue positions.

19. The microprocessor as recited in claim 18 wherein each one of said plurality of fixed issue positions comprises:

a decode unit configured to decode an instruction received by said one of said plurality of fixed issue positions;

a reservation station coupled to said decode unit, wherein said reservation station is configured to store said one of said plurality of instructions until one or more operands for said instruction are received; and a functional unit coupled to said reservation station, wherein said functional unit is configured to execute said instruction.

20. The microprocessor as recited in claim 17 wherein said instruction scanning unit is configured to divide said instruction bytes and corresponding predecode data into a plurality of subsections and is configured to scan each of said plurality of subsections independently of other ones of said plurality of subsections and in parallel with said other ones of said plurality of subsections.

* * * * *